(12) United States Patent
Furlong et al.

(10) Patent No.: US 10,295,262 B2
(45) Date of Patent: May 21, 2019

(54) THERMOSYPHON COOLERS FOR COOLING SYSTEMS WITH COOLING TOWERS

(71) Applicant: Johnson Controls Technology Company, Plymouth, MI (US)

(72) Inventors: James W. Furlong, Baltimore, MD (US); Joseph W. Pillis, Hagerstown, MD (US); Delmar E. Lehman, Chambersburg, PA (US)

(73) Assignee: Johnson Controls Technology Company, Auburn Hills, MI (US)

( * ) Notice: Subject to any disclaimer, the term of this patent is extended or adjusted under 35 U.S.C. 154(b) by 103 days.

(21) Appl. No.: 15/231,527

(22) Filed: Aug. 8, 2016

(65) Prior Publication Data

US 2016/0348978 A1 Dec. 1, 2016

Related U.S. Application Data

(63) Continuation of application No. 13/117,216, filed on May 27, 2011, now abandoned.
(Continued)

(51) Int. Cl.
*F25B 7/00* (2006.01)
*F28B 1/06* (2006.01)
(Continued)

(52) U.S. Cl.
CPC .............. *F28B 1/06* (2013.01); *F24F 5/0035* (2013.01); *F25B 7/00* (2013.01); *F28B 1/02* (2013.01);
(Continued)

(58) Field of Classification Search
CPC ........... F25D 17/02; F25B 7/00; F25B 15/006
See application file for complete search history.

(56) References Cited

U.S. PATENT DOCUMENTS 3,994,999 A 11/1976 Phelps
4,060,997 A 12/1977 Shultz et al.
(Continued)

FOREIGN PATENT DOCUMENTS

CN 2309551 Y 3/1999
CN 201093658 Y 7/2008
(Continued)

OTHER PUBLICATIONS

Korean Office Action for KR Application No. 10-2017-7014054 dated Aug. 16, 2017, 15 pgs.
(Continued)

*Primary Examiner* — Ljiljana V. Ciric
*Assistant Examiner* — Alexis K Cox
(74) *Attorney, Agent, or Firm* — Fletcher Yoder, P.C.

(57) ABSTRACT

In one embodiment, a cooling system includes a thermosyphon cooler that cools a cooling fluid through dry cooling and a cooling tower that cools a cooling fluid through evaporative cooling. The thermosyphon cooler uses natural convection to circulate a refrigerant between a shell and tube evaporator and an air cooled condenser. The thermosyphon cooler is located in the cooling system upstream of, and in series with, the cooling tower, and is operated when the thermosyphon cooler is more economically and/or resource efficient to operate than the cooling tower. According to certain embodiments, factors, such as the ambient temperature, the cost of electricity, and the cost of water, among others, are used to determine whether to operate the thermosyphon cooler, the cooling tower, or both.

6 Claims, 15 Drawing Sheets

Related U.S. Application Data

(60) Provisional application No. 61/349,080, filed on May 27, 2010.

(51) Int. Cl.

| | | |
|---|---|---|
| *F28B 9/06* | (2006.01) | |
| *F28B 11/00* | (2006.01) | |
| *F28C 1/00* | (2006.01) | |
| *F28D 15/00* | (2006.01) | |
| *F28D 15/02* | (2006.01) | |
| *F28F 19/00* | (2006.01) | |
| *F28F 27/00* | (2006.01) | |
| *F28F 27/02* | (2006.01) | |
| *F28D 21/00* | (2006.01) | |
| *F24F 5/00* | (2006.01) | |
| *F28C 1/14* | (2006.01) | |
| *F28D 7/10* | (2006.01) | |
| *F28B 1/02* | (2006.01) | |

(52) U.S. Cl.
CPC ........... *F28B 9/06* (2013.01); *F28B 11/00* (2013.01); *F28C 1/00* (2013.01); *F28C 1/14* (2013.01); *F28D 7/103* (2013.01); *F28D 15/00* (2013.01); *F28D 15/025* (2013.01); *F28D 15/0266* (2013.01); *F28D 21/0001* (2013.01); *F28F 19/006* (2013.01); *F28F 27/003* (2013.01); *F28F 27/02* (2013.01); *F28C 2001/006* (2013.01); *Y10T 29/49359* (2015.01)

(56) References Cited

U.S. PATENT DOCUMENTS

| | | | |
|---|---|---|---|
| 4,076,771 | A | 2/1978 | Houx, Jr. et al. |
| 4,269,796 | A | 5/1981 | Glicksman et al. |
| 4,270,358 | A | 6/1981 | Husain et al. |
| 4,446,914 | A | 5/1984 | Russell |
| 4,932,220 | A | 6/1990 | Inoue |
| 5,195,577 | A | 3/1993 | Kameda et al. |
| 5,435,382 | A | 7/1995 | Carter |
| 5,669,225 | A | 9/1997 | Beaverson et al. |
| 5,694,776 | A | 12/1997 | Sahm |
| 5,816,318 | A | 10/1998 | Carter |
| 5,890,371 | A | 4/1999 | Rajasubramanian et al. |
| 5,974,816 | A | 11/1999 | Endo |
| 6,102,106 | A | 8/2000 | Manning et al. |
| 6,213,200 | B1 | 4/2001 | Carter et al. |
| 6,564,864 | B2 | 5/2003 | Carter et al. |
| 7,107,782 | B2 | 9/2006 | Carter |
| 7,310,958 | B2 | 12/2007 | Carter et al. |
| 7,578,139 | B2 | 8/2009 | Nishikawa et al. |
| 7,631,511 | B2 | 12/2009 | Al-Azmi et al. |
| 2003/0033831 | A1 | 2/2003 | Davies et al. |
| 2003/0150226 | A1 | 8/2003 | Jensen |
| 2004/0211202 | A1 | 10/2004 | Katogi et al. |
| 2005/0072171 | A1 | 4/2005 | Jensen |
| 2005/0109057 | A1 | 5/2005 | Sone |
| 2005/0172644 | A1 | 8/2005 | Zhang et al. |
| 2005/0210910 | A1 | 9/2005 | Rigney et al. |
| 2006/0162354 | A1 | 7/2006 | Jensen |
| 2007/0079622 | A1 | 4/2007 | Bradley et al. |
| 2007/0095093 | A1 | 5/2007 | Narayanamurthy |
| 2007/0107450 | A1 | 5/2007 | Sasao et al. |
| 2007/0184320 | A1 | 8/2007 | Domen |
| 2007/0187851 | A1 | 8/2007 | Facius et al. |
| 2007/0240438 | A1 | 10/2007 | King |
| 2007/0256437 | A1 | 11/2007 | Singh et al. |
| 2008/0022716 | A1 | 1/2008 | Eaton et al. |
| 2008/0184716 | A1 | 8/2008 | Furutachi |
| 2009/0065597 | A1 | 3/2009 | Garozzo et al. |
| 2009/0077981 | A1 | 3/2009 | Wyatt et al. |
| 2009/0078401 | A1 | 3/2009 | Cichanowicz |
| 2009/0090488 | A1 | 4/2009 | McCann |
| 2009/0242174 | A1 | 10/2009 | McCutchen et al. |
| 2009/0283245 | A1 | 11/2009 | Hentschel et al. |
| 2009/0293507 | A1 | 12/2009 | Narayanamurthy et al. |
| 2009/0323886 | A1 | 12/2009 | El-genk et al. |
| 2010/0018237 | A1 | 1/2010 | Wallace |
| 2010/0063647 | A1 | 3/2010 | Yeh et al. |
| 2010/0065245 | A1 | 3/2010 | Imada et al. |
| 2010/0139294 | A1 | 6/2010 | Lowe et al. |
| 2010/0206248 | A1 | 8/2010 | Mok |
| 2010/0242533 | A1 | 9/2010 | De Larminat et al. |
| 2010/0243210 | A1 | 9/2010 | Rosenfeld et al. |
| 2010/0269524 | A1 | 10/2010 | Welch |
| 2011/0048046 | A1 | 3/2011 | Sommer et al. |

FOREIGN PATENT DOCUMENTS

| | | | |
|---|---|---|---|
| EP | 0641978 | A1 | 3/1995 |
| EP | 0999418 | A2 | 5/2000 |
| EP | 1505357 | A1 | 2/2005 |
| EP | 1574804 | A2 | 9/2005 |
| JP | 2001147093 | A | 5/2001 |
| JP | 2003-194483 | A | 7/2003 |
| JP | 2006329601 | A | 12/2006 |
| KR | 10-2007-0077158 | A | 7/2007 |
| WO | 2007102978 | A1 | 9/2007 |
| WO | 2007143798 | A1 | 12/2007 |

OTHER PUBLICATIONS

Blackhurst, D.R., "Recent Developments in Thermosyphon Cooling for Air-Conditioning", The Institute of Refrigeration, 4 Proc. Inst. R. 1-12 (1998-99).

Invitation to Pay Additional Fees and Partial International Search Report for PCT/US2010/042737 dated Mar. 22, 2011.

Patent Examination Report No. 2 for Australian Patent Application No. 2010354078, dated Dec. 3, 2013.

Korean Office Action for KR Application No. 10-2012-7033662 dated May 27, 2014.

CN Office Action for Application No. 201080067061.X dated Dec. 17, 2015.

Chinese Office Action for CN Application No. 201080067061.X dated Dec. 14, 2016, 14 Pages.

IO LIST

ANALOG INPUTS
- INTERMEDIATE TEMPERATURE (70)
- PROCESS HEAT EXCHANGER LEAVING TEMPERATURE (72)
- PROCESS HEAT EXCHANGER ENTERING TEMPERATURE (74)
- AMBIENT TEMPERATURE(68)
- MOTOR AMPS (28)
- EVAPORATOR TEMP (57)
- MAKEUP WATER FLOW RATE (47)

ANALOG OUTPUTS
- VFD SPEED (28)

DIGITAL INPUT
- DIFFERENTIAL PRESSURE SWITCH (58)
- FILL LEVEL (92)

DIGITAL OUTPUTS
- COOLER ISOLATION VALVE (24)
- RETURN ISOLATION VALVE (30)
- REFRIGERATION STOP VALVE (93)
- SUPPLY DRAIN VALVE (60)
- RETURN DRAIN VALVE (62)
- VENT LINE VALVE (66)
- FANS START (28)
- COOLING TOWER VALVE (32)

INPUTS (SETPOINTS)
- CONTROL SETPOINT
- WATER RATE /GAL
- ELECTRICAL RATE /kWH

CALCULATED STATUS
- kWTS = KILOWATT DRAW OF FANS (AND PUMPS IF APPLICABLE)
- TEPC = THERMOSYPHON ECONOMIC POWER CONSUMPTION VALUE – WILL BE CALCULATED AS: (kWts / (PROCESS HEAT EXCHANGER LEAVING TEMPERATURE- INTERMEDIATE TEMPERATURE))
- TEPCL = THERMOSYPHON ECONOMIC POWER CONSUMPTION LIMIT = MAX KWts PER DEGREE OF COOLING AT THE CONTROL SETPOINT WHICH WILL INSURE THAT AVOIDED WATER COSTS, WASTE WATER COST, WATER TREATMENT COST, AND COOLING TOWER FAN POWER CONSUMPTION ARE GREATER THAN ELECTRIC COSTS TO OPERATE THERMOSYPHON COOLER. WILL BE FIELD ADJUSTABLE TO OPTIMIZE LOCAL WATER AND ELECTRIC RATES.
- TST = THERMOSYPHON START THRESHOLD = A PREDETERMINED TEMPERATURE DIFFERENTIAL BETWEEN PROCESS HEAT EXCHANGER LEAVING TEMPERATURE AND AMBIENT TEMPERATURE WHICH IS KNOWN TO ENABLE THERMOSYPHON ECONOMIC POWER CONSUMPTION BELOW TEPCL AT LOW FAN SPEED.

FIG. 8

THERMOSYPHON COOLERS FOR COOLING SYSTEMS WITH COOLING TOWERS

CROSS REFERENCE TO RELATED APPLICATIONS

This application is a continuation of U.S. patent application Ser. No. 13/117,216, filed May 27, 2011, entitled "THERMOSYPHON COOLERS FOR COOLING SYSTEMS WITH COOLING TOWERS," which claims priority from and the benefit of U.S. Provisional Application Ser. No. 61/349,080, filed May 27, 2010, entitled "THERMOSYPHON COOLERS FOR COOLING SYSTEMS WITH COOLING TOWERS," which are hereby incorporated by reference.

BACKGROUND

The invention relates generally to thermosyphon coolers, and more particularly, to thermosyphon coolers for use in cooling systems that employ cooling towers.

Cooling towers are often used to remove heat from heating, ventilating, and air conditioning (HVAC) systems, power plants, and industrial processes. In general, cooling towers may include nozzles that direct water down through the tower, while a fan, or free circulation, directs air up through the tower. The interaction between the air and water may promote evaporation of a portion of the water, thereby cooling the remaining water. In open loop cooling towers, the cooling tower water may be circulated directly through the cooling system, while in closed loop cooling towers, the cooling tower water may be directed over a heat exchanger coil that cools a separate flow of cooling fluid that in turn circulates through the cooling system.

During evaporation, water may be lost from the cooling tower and impurities, such as salts or other dissolved solids, may be concentrated within the cooling tower. A portion of the cooling tower water containing concentrated impurities may be removed as blowdown. To account for water losses due to evaporation and blowdown, makeup water may be added to the cooling towers. Accordingly, cooling towers may consume very substantial quantities of water, in some cases millions of gallons of water each year, and may be one of the largest consumers of water within a process.

DRAWINGS

FIG. 8 is a chart depicting inputs and outputs that may be employed to operate a thermosyphon cooler.

DETAILED DESCRIPTION

Figure 1:
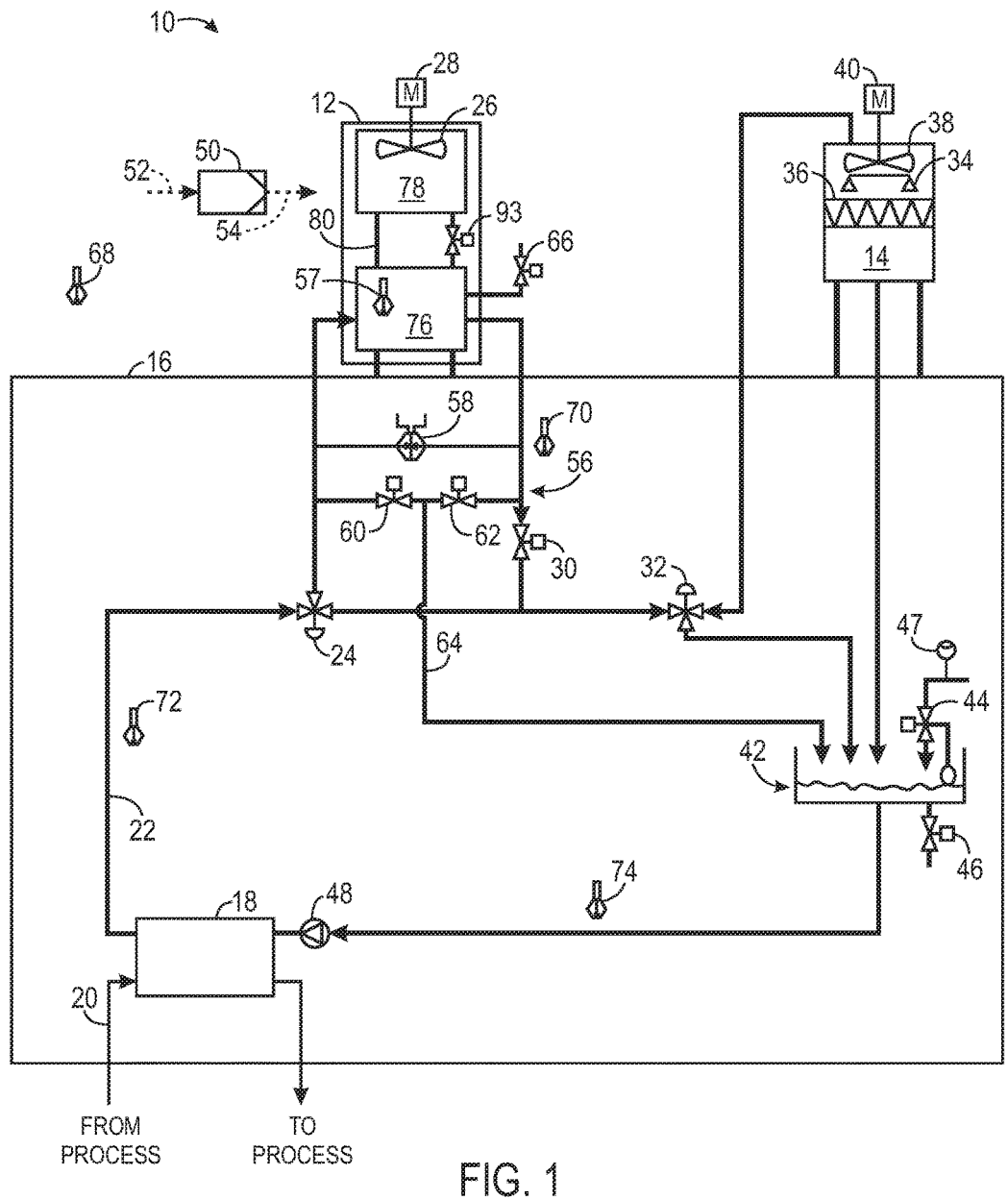
FIG. 1 is a schematic diagram of an embodiment of a cooling system that employs a thermosyphon cooler and an open loop cooling tower.

The present disclosure is directed to thermosyphon coolers that may be employed in cooling systems that use cooling towers. As used herein, the term "cooling tower" includes open loop and closed loop cooling towers that cool a fluid, such as water, by evaporative cooling using ambient air. Cooling towers may be particularly useful for cooling process fluids due to the relatively low temperatures that may be achieved by evaporative cooling, as compared to dry cooling. Further, cooling towers may provide flexibility in determining a system layout because the cooling towers may be located farther away from a process, allowing real estate in the vicinity of the cooled building or process to be used for other purposes. However, due to the evaporative cooling, cooling towers may consume large amounts of water. To conserve water, it may be desirable to employ other types of cooling systems in conjunction with cooling towers, particularly in areas where water is in short supply and/or is costly.

Accordingly, the present disclosure is directed to dry heat rejection systems, such as thermosyphon coolers, that may be employed to provide additional and/or alternative cooling in cooling systems that include cooling towers. The thermosyphon coolers may be located in cooling systems upstream of, and in series with, the cooling towers, and may be operated when the thermosyphon coolers are more economically and/or resource efficient to operate than the cooling towers. For example, when ambient temperatures are low, it may be beneficial to operate the thermosyphon coolers to reduce water consumption of the cooling towers. When ambient temperatures are high, it may be desirable to operate the cooling towers to provide the lower process cooling fluid temperatures that may be achieved through evaporative cooling. According to certain embodiments, factors, such as the ambient temperature, the cost of electricity, the cost of water, the temperature of the heated cooling fluid exiting the process heat exchanger, and the desired temperature of the cooling fluid entering the process heat exchanger, among others, may be used to determine whether to operate the thermosyphon coolers, the cooling towers, or both.

In an exemplary arrangement, a thermosyphon cooler will include a shell and tube evaporator and an air cooled condenser. The cooling tower water may flow through the tubes of the evaporator and may transfer heat to refrigerant circulating between the evaporator and the air cooled condenser. The thermosyphon cooler may be designed to minimize the pressure drop within the system so that the refrigerant is circulated between the evaporator and the condenser through natural convection. As used herein, the term "natural convection" means circulation of a fluid without mechanical force, for example, without mechanical force as provided by a pump or a compressor. According to certain embodiments, the buoyancy of the heated refrigerant and the height difference between the air cooled condenser and the evaporator may provide the driving force for circulating the refrigerant through natural convection. Because the refrigerant may be circulated using natural convection, the condenser fans and their motor(s) may be the only moving parts in the thermosyphon cooler. Accordingly, the thermosyphon coolers may have relatively low rates of energy consumption and maintenance when compared to traditional dry coolers that implement pumped freeze protectant cooling loops.

The evaporator within the thermosyphon cooler also may include access covers and/or removable components that allow the interior of the evaporator tubes to be cleaned. Accordingly, the thermosyphon coolers may be particularly well-suited for circulating cooling tower water in open loop cooling tower systems where the water may be exposed to dissolved solids and other contaminants. Further, the thermosyphon cooler may include a freeze protection system, which may allow the thermosyphon cooler to cool the cooling tower water directly, rather than employing a separate loop, which contains a freeze protectant, such as glycol.

FIG. 1 is a schematic view of a cooling system 10 that employs a thermosyphon cooler 12 and a cooling tower 14. The cooling system 10 may be primarily located within a building 16 or area that is maintained at temperatures above freezing. However, certain components of cooling system 10, such as thermosyphon cooler 12 and cooling tower 14, may be located outside of building 16, for example, on the roof of building 16. Further, in other embodiments, cooling tower 14 may be located a distance away from building 16 or the process area and, in certain embodiments, may be located at ground level.

Cooling system 10 includes a process heat exchanger 18 that may be used to transfer heat from a process loop 20 to a cooling system loop 22. According to certain embodiments, process loop 20 may circulate a process fluid, such as refrigerant, steam, or other vapor to be condensed. For example, process loop 20 may circulate compressed refrigerant vapor to be condensed from a water chiller. In another example, process loop 20 may circulate steam to be condensed from a steam turbine. In another example, process loop 20 may circulate a process fluid for an industrial process that may require cooling.

Cooling system loop 22 may circulate a fluid to be cooled, such as water or a mixture of water and other components. As the cooling fluid flows through process heat exchanger 18, the cooling fluid may absorb heat from the process fluid. According to certain embodiments, an intermediate fluid, such as refrigerant may be used to transfer heat from the process fluid within process loop 20 to the cooling fluid within cooling system loop 22. For example, in certain embodiments, process heat exchanger 18 may be a water cooled condenser that is part of a chiller that circulates a refrigerant to transfer heat from process loop 20 to cooling system loop 22. In these embodiments, the process fluid may flow through an evaporator of the chiller. However, in other embodiment, the intermediate fluid may be omitted and the process heat exchanger 18 may be used to transfer heat directly from the process fluid to the cooling fluid. Moreover, in yet other embodiments, process heat exchanger 18 may be omitted and the cooling fluid within cooling system loop 22 may be circulated directly to the process to be cooled.

As the cooling fluid flows through process heat exchanger 18, the cooling fluid may absorb heat from the process fluid. Accordingly heated cooling fluid may exit process heat exchanger 18 and may flow through cooling system loop 22 through a valve 24 to thermosyphon cooler 12. In certain embodiments, a pump may be included to circulate the cooling fluid to thermosyphon cooler 12 from valve 24. However, in other embodiments, the pump may be omitted.

The heated cooling fluid may enter thermosyphon cooler 12 where the cooling fluid may be cooled. As described below with respect to FIGS. 2 and 3, thermosyphon cooler 12 may include a shell and tube evaporator 76 and an air cooled condenser 78. A refrigerant loop 80 may be employed to transfer heat from the cooling fluid flowing through shell and tube evaporator 76 to air cooled condenser 78. Heat may be rejected from thermosyphon cooler 12 through ambient air directed over air cooled condenser 78 by one or more fans 26 driven by one or more motors 28. According to certain embodiments, motors 28 may incorporate variable speed drives (VSD's) that allow the speed of fans 26 to be adjusted to increase and decrease the amount of cooling provided by thermosyphon cooler 12. Further, in certain embodiments, motors 28 may be electronically commutated motors (ECM's), which allow the fan speed to be adjusted. The cooling fluid may then exit thermosyphon cooler 12 and may flow through valves 30 and 32 to cooling tower 14, where the cooling fluid may be further cooled through evaporative cooling.

Within cooling tower 14, the cooling fluid may be cooled via evaporative cooling with ambient air. The cooling fluid may enter cooling tower 14 through nozzles 34 that direct the cooling fluid down through cooling tower 14 over a fill material 36, such as splash bars, sheet fill packs, or any other suitable surface. A fan 38 driven by a motor 40 may direct air up through cooling tower 14 so that the air mixes with the cooling fluid flowing through cooling tower 14 to promote evaporative cooling. According to certain embodiments, fan 38 may be a centrifugal or axial fan driven by a VSD or ECM. However, in other embodiments, fan 38 may be omitted and air movement within the cooling tower would be induced by natural convection. Cooling tower 14 may be a crossflow or a counterflow cooling tower. Further, although shown as an induced draft cooling tower, in other embodiments, cooling tower 14 may be a forced draft cooling tower.

The cooled cooling fluid may then exit cooling tower 14 and may be collected within a sump 42. As shown, sump 42 is located within building 16, which, in certain embodiments, may inhibit freezing of the cooling fluid within sump 42. However, in other embodiments, sump 42 may be an integral part of cooling tower 14 and may be located outside of building 16, as described further below with respect to FIG. 4.

As the cooling fluid flows through cooling tower 14 and contacts ambient air, solids and other contaminants may become entrapped or entrained within the cooling fluid. Additional minerals, salts, and other contaminants may enter the cooling fluid with make-up water. As pure water is removed from the cooling fluid through evaporation, the concentration of such contaminants will increase within the cooling fluid. Accordingly, a portion of the cooling fluid, which may contain particulates, dissolved solids, and/or contaminants, may be removed as blowdown by opening a valve 46. A valve 44 also may be opened to direct makeup cooling fluid into sump 42 to account for losses in the cooling fluid due to blowdown and evaporation. A flow meter 47 may be employed to measure the amount of water that is supplied to sump 42 through valve 44 as makeup water. For example, flow meter 47 may measure the flow rate of water supplied to sump 42, and the flow rate data may be provided to a controller 50, which in turn may calculate the amount of makeup water that is supplied to sump 42. In certain embodiments, controller 50 may use the flow rate data from flow meter 47 to calculate the water costs of operating cooling system 10. The cooled cooling fluid from sump 42 may then be returned to process heat exchanger 18 via a pump 48 where the cooling fluid may again absorb heat from the process fluid circulating within process fluid loop 20.

Cooling system 10 also may include a controller 50 that governs operation of cooling system 10. Controller 50 may receive input signals 52 from components, such as valves and sensors within system 10, in the form of analog and/or digital inputs as shown in FIG. 8. Based on the input signals, controller 50 may send output signals 54, such as analog and/or digital outputs shown in FIG. 8, to vary operation of cooling system 10. As described further below with respect to FIGS. 6 and 7, controller 50 may use the input and output signals 52 and 54 to enable operation of thermosyphon cooler 12 whenever it is efficient to operate thermosyphon cooler 12 in addition to, or instead of cooling tower 14.

According to certain embodiments, controller 50 also may govern operation of a freeze protection system 56 included within cooling system 10. Freeze protection system 56 may include a differential pressure switch 58 that measures the pressure difference between the cooling fluid entering and exiting thermosyphon cooler 12 and a temperature sensor 57 that measures the temperature of the refrigerant within the shell side of evaporator 76. Controller 50 may use input signals 52 from differential pressure switch 58 to determine whether cooling fluid is flowing through thermosyphon cooler 12. If controller 50 detects that there is no cooling fluid flow based on input from differential pressure switch 58, controller 50 may initiate a low temperature protection mode of freeze protection system 56, which may inhibit freezing of the cooling fluid used within thermosyphon cooler 12. To initiate the low temperature protection mode, controller 50 may close a valve 93 to promote collection of the refrigerant within condenser 78. The lack of refrigerant flow to evaporator 76 may inhibit freezing of the cooling fluid within evaporator 76. Controller 50 also may turn on supplemental heat for evaporator 76 to provide an influx of heat to evaporator 76 to inhibit freezing of the cooling fluid included within evaporator 76.

Controller 50 also may use input from temperature sensor 57 to govern operation of freeze protection system 56. For example, when controller 50 receives an input from temperature sensor 57 that indicates that the temperature within evaporator 76 is below a certain set point, controller 50 may initiate a freeze protection mode of freeze protection system 56, which may drain the cooling fluid from thermosyphon cooler 12 and may divert the flow of the cooling fluid around thermosyphon cooler 12. To drain the cooling fluid from thermosyphon cooler 12, controller 50 may open valves 60 and 62 to direct the cooling fluid to a drain line 64. As shown, drain line 64 may direct the cooling fluid to sump 42. However, in other embodiments, for example, where sump 42 is located outside of building 16, drain line 64 may be connected to a sewer or a collection reservoir.

Controller 50 also may close valve 30 to direct cooling fluid exiting thermosyphon cooler 12 to drain line 64 through valve 62. Further, controller 50 may open a valve 66 to inject air into thermosyphon cooler 12 to facilitate drainage of the cooling fluid from thermosyphon cooler 12. According to certain embodiments, valve 66 may be designed to inject air into the evaporator tubes of thermosyphon cooler 12 to displace the cooling fluid from the evaporator tubes. To inhibit the flow of additional cooling fluid into thermosyphon cooler 12, controller 50 also may change the position of valve 24 to direct the cooling fluid from process heat exchanger 18 to bypass thermosyphon cooler 12 and flow directly to valve 32. According to certain embodiments, valves 60, 62, and 66 may be solenoid valves designed to fail in the open position, which, in the event of a power failure, may automatically enable freeze protection system 56.

Cooling system 10 also may include temperature sensors 68, 70, 72, and 74 that may be used to detect temperatures used by controller 50 to govern operation of cooling system 10. For example, temperature sensor 68 may detect the ambient air temperature; temperature sensor 70 may detect the temperature of the cooling fluid exiting thermosyphon cooler 12; temperature sensor 72 may detect the temperature of the cooling fluid exiting process heat exchanger 18; and temperature sensor 74 may detect the temperature of the cooling fluid entering process heat exchanger 18. Temperature sensors 68, 70, 72, and 74 may provide the temperatures to controller 50 in the form of input signals 52, which may be used to control operation of cooling system 10.

According to certain embodiments, controller 50 may use temperatures sensed by some, or all of the sensors 57, 68, 70, 72, and 74 to determine when to enable freeze protection system 56. For example, controller 50 may initiate the low temperature protection mode of freeze protection system 56 when there is no flow, as detected by differential pressure switch 58, and when the ambient temperature, as detected by sensor 68, is below an ambient temperature set point. In another example, controller 50 may disable a freeze protection mode of freeze protection system 56 when the temperature of the cooling fluid exiting thermosyphon cooler 12, as detected by sensor 70, is above an intermediate temperature set point.

Controller 50 also may use temperatures sensed by some, or all of, the sensors 57, 68, 70, 72, and 74 to determine operating parameters of thermosyphon cooler 12. According to certain embodiments, cooling system 10 may be designed to cool the cooling fluid entering process heat exchanger 18 to a specific temperature, which may be referred to as the cooling system temperature set point. If the temperature of the cooling fluid entering process heat exchanger 18, as detected by sensor 74, is above the cooling system temperature set point, controller 50 may provide output signals to motor 28 to increase the speed of the condenser fans 26. Similarly, if the temperature of the cooling fluid entering process heat exchanger 18, as detected by sensor 74, is below the cooling system temperature set point, controller 50 may provide output signals to motor 28 to decrease the speed of the condenser fans 26.

Controller 50 also may use temperatures sensed by some, or all of the sensors 57, 68, 70, 72, and 74 to determine when to operate cooling tower 14. For example, if the temperature of the cooling fluid exiting thermosyphon 12, as detected by sensor 70, is equal to or below the cooling system temperature set point, controller 50 may provide an output signal to valve 32 to change the position of valve 32 so that the cooling fluid bypasses cooling tower 14 and proceeds directly to sump 42. In this mode of operation, thermosyphon cooler 12 may be capable of providing enough cooling capacity to achieve the cooling system temperature set point, and accordingly, cooling system 10 may be operated without employing cooling tower 14, which may reduce water consumption within cooling system 10.

As described further below with respect to FIGS. 6 and 7, controller 50 also may use temperatures sensed by some, or all of the sensors 57, 68, 70, 72, and 74 to determine when to operate thermosyphon cooler 12. For example, controller 50 may use temperatures sensed by sensors 72 and 68 to determine the temperature difference between the cooling fluid exiting process heat exchanger 18 and the ambient air. Controller 50 may then use this temperature difference in conjunction with water and electricity rates to determine when it is economically and/or resource efficient to operate thermosyphon cooler 12. As described further below with respect to FIGS. 6 and 7, controller 50 may selectively enable operation of the thermosyphon cooler based on the temperature difference, water costs, and/or electricity costs. In these embodiments, controller 50 may send output signals to equipment, such as valves 24, 30, and 32, among, others to selectively enable or disable the thermosyphon cooler. In other embodiments, controller 50 may determine whether the thermosyphon cooler should be enabled or disabled and may output this recommendation to a display. An operator may then view the recommendation and adjust operation of the cooling system based on the recommendation.

Figure 2:
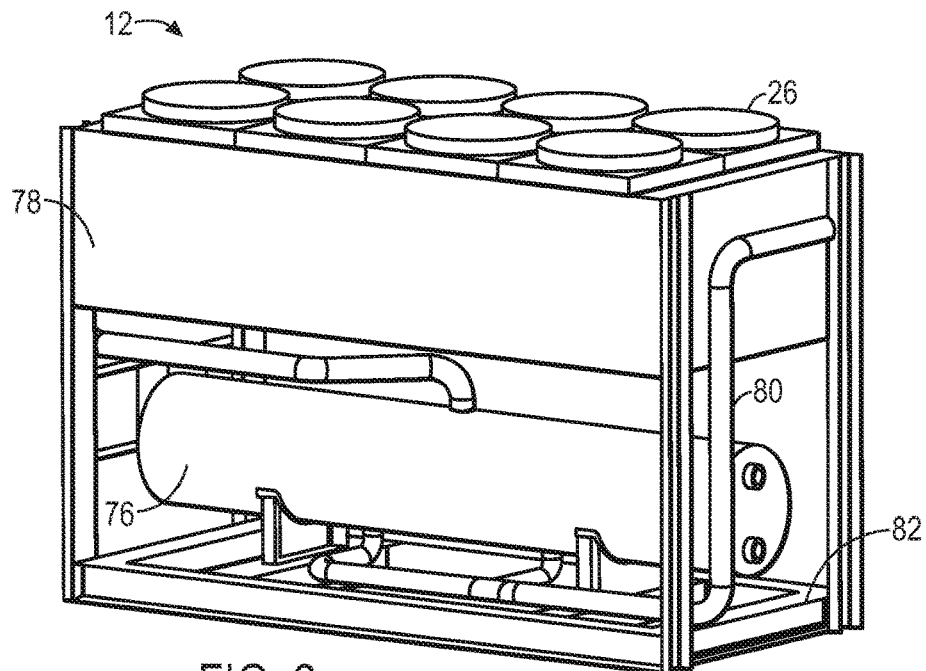
FIG. 2 is a perspective view of an embodiment of the thermosyphon cooler shown in FIG. 1.
Figure 3:
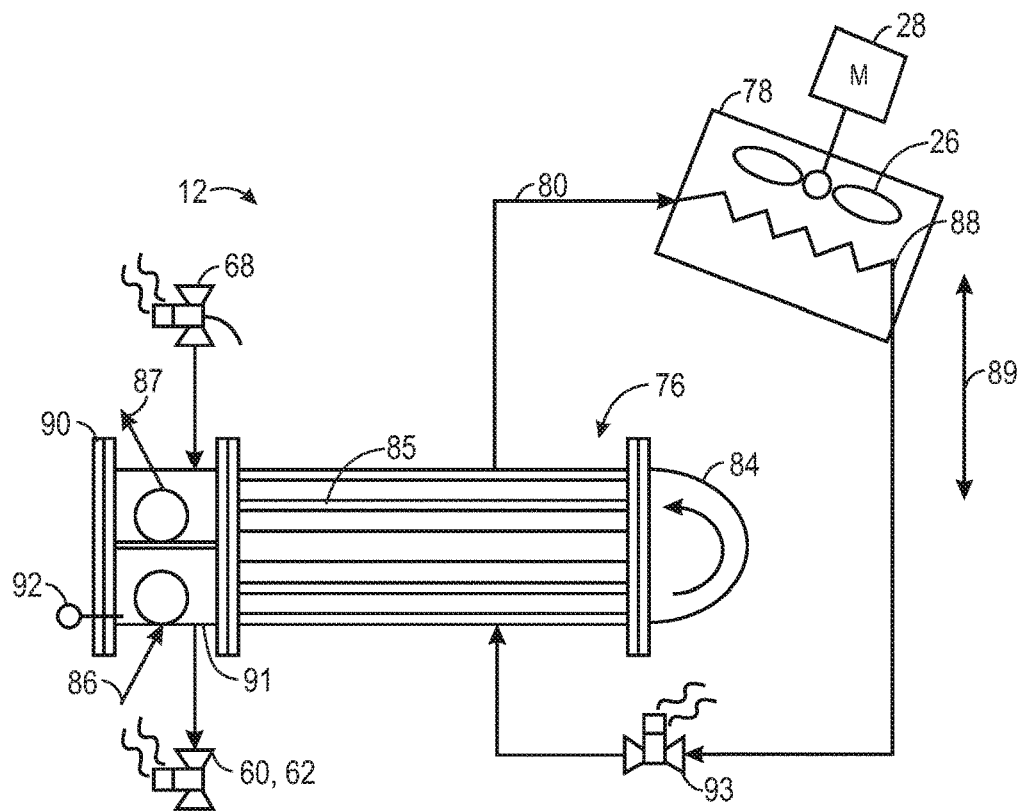
FIG. 3 is a schematic diagram of an embodiment of the thermosyphon cooler shown in FIG. 1.

FIGS. 2 and 3 depict an embodiment of thermosyphon cooler 12. As shown in FIG. 2, thermosyphon cooler 12 includes a shell and tube evaporator 76 and an air cooled condenser 78. Shell and tube evaporator 76 may receive heated cooling fluid from process heat exchanger 18 (FIG. 1) and may transfer heat from the cooling fluid to refrigerant flowing through the evaporator 76. According to certain embodiments, the refrigerant may be an HFC or an HFO type refrigerant; however, in other embodiments, any suitable refrigerant may be employed. The heated refrigerant may be directed through piping of refrigerant loop 80 to condenser 78, where the refrigerant may be cooled by ambient air directed through condenser 78 by fans 26. The cooled refrigerant may then be returned to evaporator 76 through refrigerant loop 80. According to certain embodiments, evaporator 76 and condenser 78 may be included within a common frame 82 that allows thermosyphon cooler 12 to be sold as a single integrated package. However, in other embodiments, evaporator 76 and condenser 78 may be disposed within separate frames or may be installed within separate parts of cooling system 10. Further, although the embodiment reflected in FIG. 2 and FIG. 3 shows evaporator 76 as a shell and tube evaporator, other embodiments may include another type of evaporator, such as a plate evaporator design, in lieu of a shell and tube design.

The refrigerant and the cooling fluid may circulate through thermosyphon cooler 12 as shown in FIG. 3. Shell and tube evaporator 76 may include a shell 84 that contains the refrigerant as the refrigerant flows through evaporator 76. Shell 84 also may house tubes 85 that circulate the cooling fluid through evaporator 76. The cooling fluid may enter tubes 85 through an inlet 86 and may exit tubes 85 through an outlet 87. As the cooling fluid flows through tubes 85, the cooling fluid may transfer heat to the refrigerant flowing within shell 84. As the refrigerant absorbs heat, the heated refrigerant, which is more buoyant than the cooler refrigerant, may be drawn by natural convection through piping of refrigerant loop 80 into condenser 78, which is at a lower temperature than evaporator 76. The heated refrigerant may then flow through a heat transfer coil 88 included within condenser 78 and fans 26 may draw environmental air over coil 88 to cool the refrigerant flowing within coil 88. The cooled refrigerant may then return by gravity to shell 84 where the refrigerant may again absorb heat from the cooling fluid within tubes 85.

To promote the return of the cooled refrigerant into evaporator 76, condenser 78 may be disposed at a height 89 above evaporator 76 to promote the return of cooled refrigerant to evaporator 76. Condenser 78, evaporator 76, and piping of refrigerant loop 80 may be sized to minimize the pressure drop within thermosyphon cooler 12, thereby allowing a lower height 89 to be employed to return refrigerant from condenser 78 to evaporator 76 through natural convection. According to certain embodiments, height 89 may be less than approximately 10 to 12 feet to allow thermosyphon cooler 12 to be shipped as a single integrated package on a conventional road truck. However, in other embodiments, height 89 may be any suitable height. In certain embodiments, evaporator 76 also may be disposed at an angle to promote drainage of cooling fluid from evaporator 76. According to certain embodiments, evaporator 76 may be tilted at an angle of approximately 5 degrees with respect to horizontal.

Evaporator 76 may be designed as a cleanable evaporator where the interior of tubes 85 may be accessed for cleaning to remove contaminant buildup from particulates and/or dissolved solids that enter tubes 85 with the cooling fluid. For example, the cooling fluid may absorb solids from the environmental air that contacts the cooling fluid in cooling tower 14. To provide access to tubes 85, evaporator 76 may include an access cover 90 that may be removed to expose openings into tubes 85. Further, in other embodiments, instead of, or in addition to a removable access cover 90, evaporator 76 may include a removable head section 91 that may allow access to tubes 85 for cleaning.

In certain embodiments, evaporator 76 also may include a sensor 92, such as an optical sensor, designed to detect the level of the cooling fluid within evaporator 76. In these embodiments, sensor 92 may be used in conjunction with freeze protection system 56 to ensure that the cooling fluid has been drained from evaporator 76 when the freeze protection mode of freeze protection system 56 has been enabled. Further, in certain embodiments, thermosyphon cooler 12 may include a valve 93 disposed within piping of refrigerant loop 80 to stop the flow of refrigerant through refrigerant loop 80. In these embodiments, valve 93 may be closed by controller 50 upon detecting a condition, such as a low ambient temperature, low evaporator temperature, for example, measured at temperature sensor 92, and/or no flow within thermosyphon cooler 12, that may produce freezing. When closed, valve 93 may promote collection of the refrigerant within coil 88 of condenser 78, which may inhibit circulation of the refrigerant within refrigerant loop 80 and prohibit circulation of refrigerant to evaporator 76. Evaporator 76 also may incorporate supplemental heating and/or insulation, to provide an influx of heat to evaporator 76 upon detecting a potential freeze condition. For example, in certain embodiments, evaporator 76 may include heat tracing and/or cartridge heaters that can be turned on to provide heat when a potential freeze condition is detected.

Figure 4:
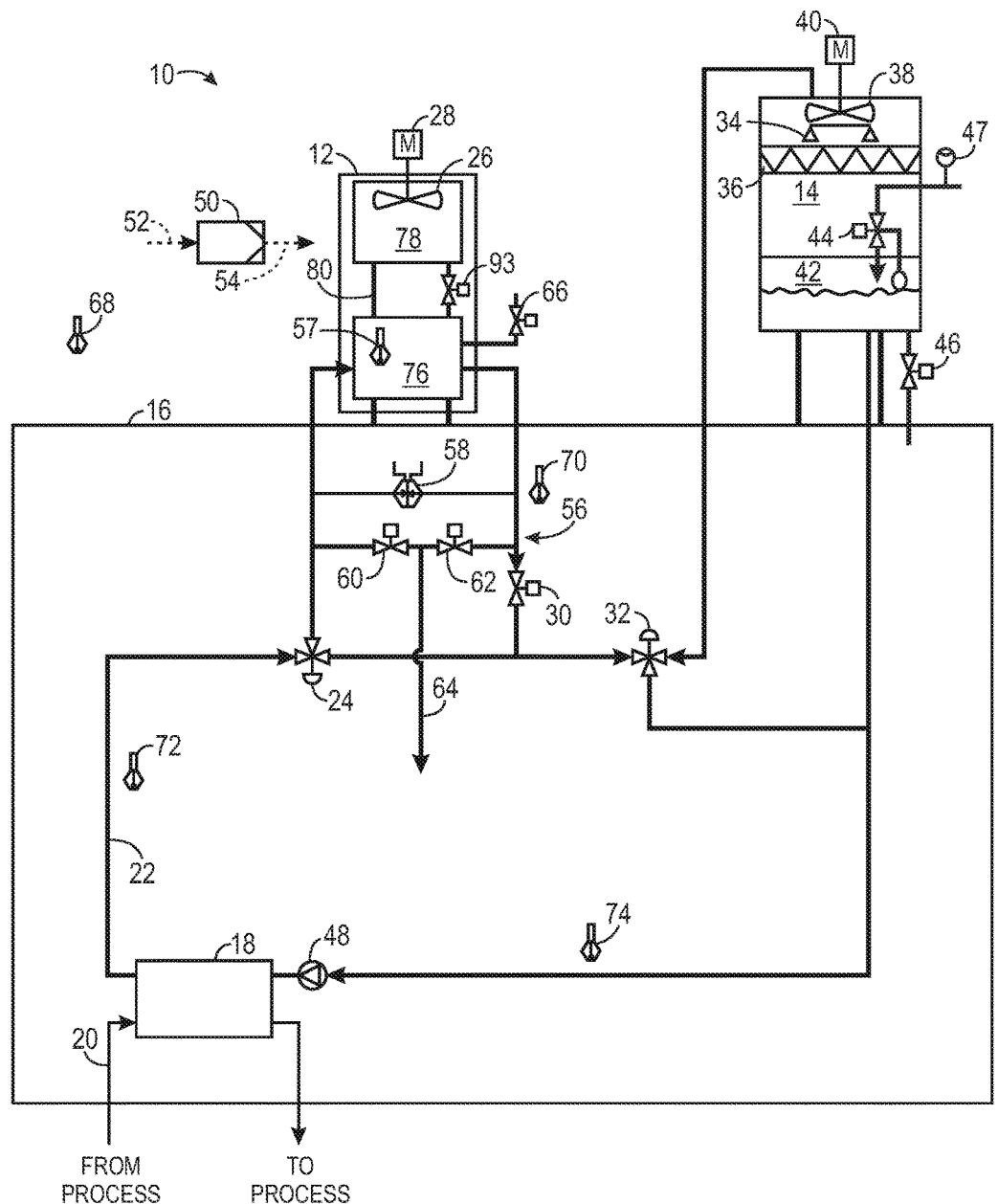
FIG. 4 is a schematic diagram of another embodiment of a cooling system that employs a thermosyphon cooler and an open loop cooling tower.

FIG. 4 depicts another embodiment of the cooling system 10 that includes open loop cooling tower 14 and thermosyphon cooler 12. The embodiment of cooling system 10 shown in FIG. 4 is generally similar to the embodiment of cooling system 10 described above with respect to FIG. 1. However, the cooling tower 14 shown in FIG. 4 includes an integrated sump 42 rather than a sump that is disposed within building 16, as shown in FIG. 1.

As shown in FIG. 4, the cooling fluid may be cooled within thermosyphon cooler 12. Thermosyphon cooler 12 includes freeze protection system 56, which may operate as described above with respect to FIG. 1. However, drain line 64 may be directed to a sewer or collection reservoir, rather than to sump 42. The cooling fluid exiting thermosyphon cooler 12 may flow through valve 32 to cooling tower 14. Within cooling tower 14, the cooling fluid may be directed over fill material 36 by nozzles 34 and may collect within sump 42, which may be located in the lower portion of cooling tower 14. Valve 44 may be opened to direct makeup cooling fluid into sump 42 to account for losses in the cooling fluid due to blowdown and evaporation. Flow meter 47 may be employed to measure the amount of water that is provided to sump 42. Valve 46 also may be opened to remove blowdown from cooling tower 14. The cooled cooling fluid from sump 42 may then be returned to process heat exchanger 18 via pump 48. Within process heat exchanger 18, the cooling fluid may again absorb heat from the process fluid circulating within process fluid loop 20.

Figure 5:
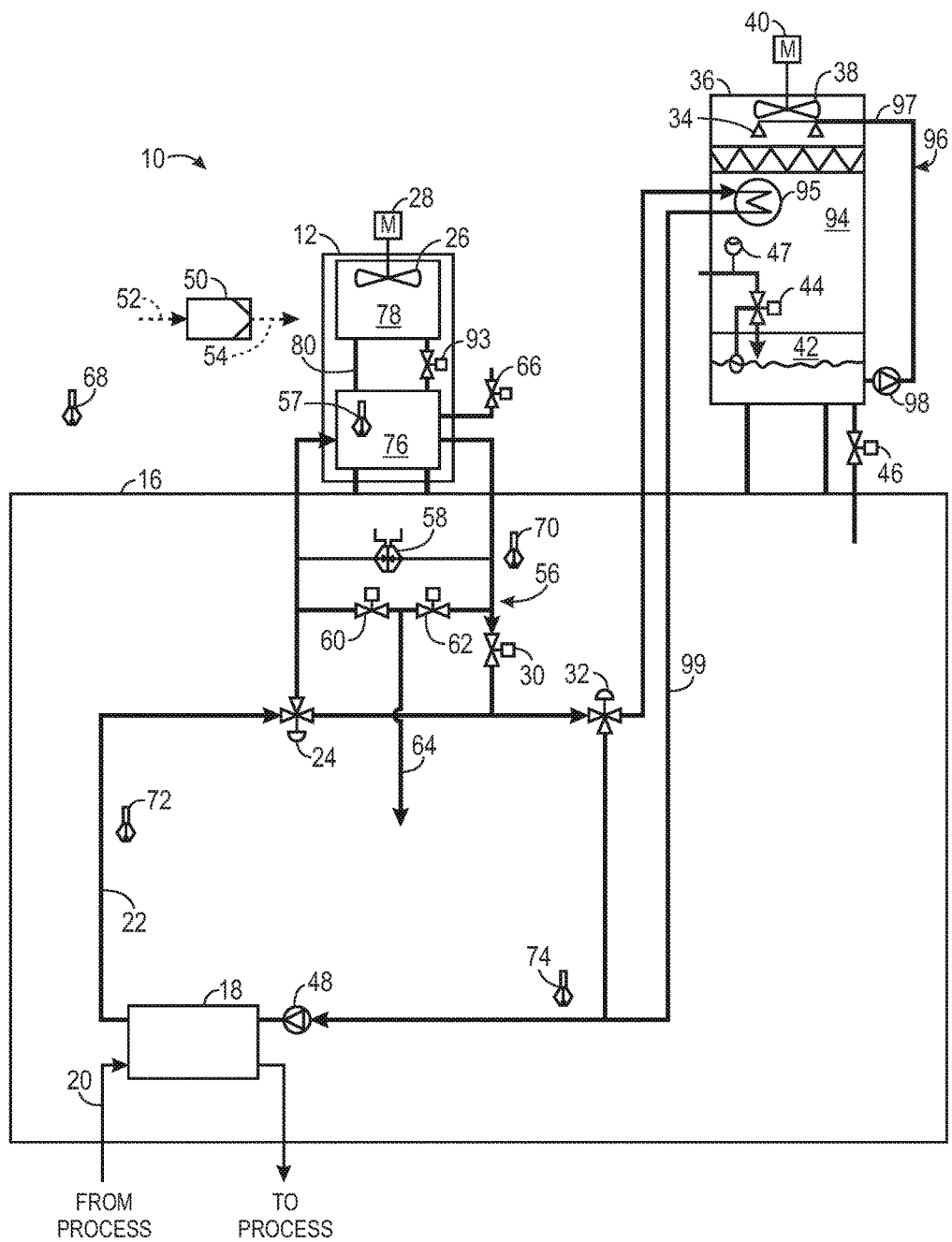
FIG. 5 is a schematic diagram of an embodiment of a cooling system that employs a thermosyphon cooler and a closed loop cooling tower.

As described above with respect to FIGS. 1 through 4, thermosyphon cooler 12 may be employed in a cooling system 10 that includes an open loop cooling tower where environmental air may directly contact the cooling fluid flowing through cooling system 10. However, in other embodiments, thermosyphon cooler 12 may be employed within a closed circuit cooling tower as shown in FIG. 5. Closed loop cooling towers may be particularly useful in systems where it may be desirable to reduce contaminants in the cooling fluid.

The embodiment of the cooling system 10 shown in FIG. 5 may be generally similar to the cooling system described above with respect to FIG. 1. However, rather than allowing the cooling fluid within cooling system loop 22 to be directly exposed to the ambient air within cooling tower 14 as in FIG. 1, cooling system 10 in FIG. 5 is isolated from contacting ambient air by employing closed circuit cooling tower 94 in lieu of cooling tower 14. Within closed circuit cooling tower 94, the cooling fluid flowing through cooling system loop 22 may be cooled by closed circuit cooling tower cooling coil 95 which may transfer heat to a spray water loop 96 that is integral to closed circuit cooling tower 94. The spray water circulating within spray water loop 96 may be cooled via evaporative cooling with ambient air, thus enabling the cooling fluid flowing through cooling system loop 22 from being exposed to the airborne and makeup water borne contaminants normally associated with open cooling system loops. The spray water loop may include nozzles 34 which direct the spray water over the closed circuit cooling tower cooling coil 95, a sump 42 to collect the spray water, spray water piping 97, and a spray water pump 98. A fan 38 driven by a motor 40 may direct air up through closed circuit cooling tower 94 to promote evaporative cooling of the spray water. A blowdown valve 46 may be used to remove contaminants from spray water loop 96 and makeup water valve 44 may be used to direct makeup spray water into sump 42 to account for losses in spray water due to blowdown and evaporation. Further, flow meter 47 may be employed to measure the amount of water that is provided to sump 42.

Figure 6:
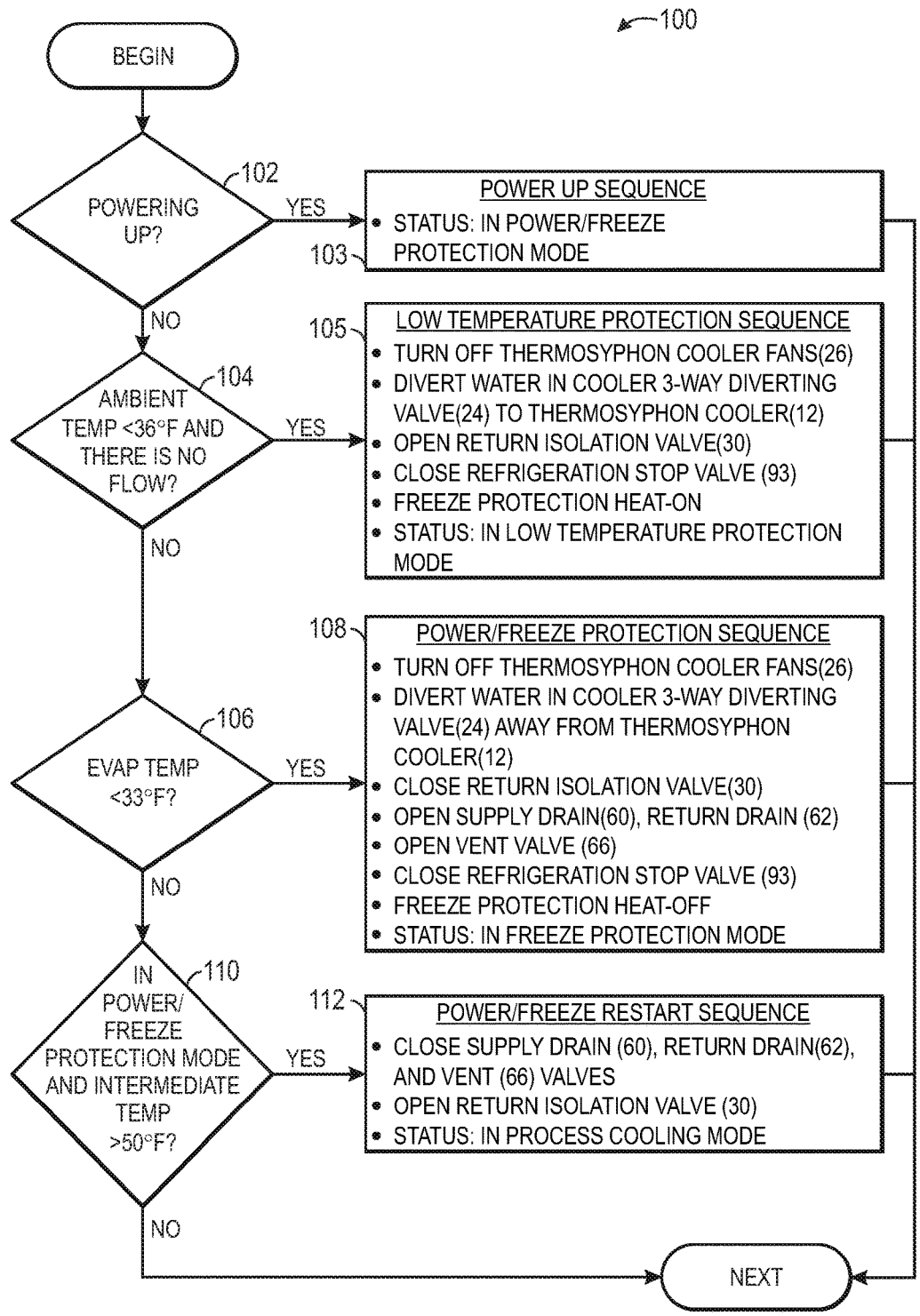
FIG. 6 is a flow chart depicting a method for operating a thermosyphon cooler.

FIG. 6 depicts a method 100 that may be employed to govern operation of a cooling system 10 that includes an open loop cooling tower, as shown in FIGS. 1 and 4, or a closed loop cooling tower, as shown in FIG. 5. According to certain embodiments, controller 50 may include a processor that executes code to perform method 100. The executable code may include instructions for performing method 100 and may be stored in a non-transitory, tangible, computer readable medium, such as a volatile or non-volatile memory, which in certain embodiments may be included in controller 50.

Method 100 may begin by determining (block 102) whether cooling system 10 is beginning operation. For example, cooling system 10 may begin operation upon startup of process heat exchanger 18. If cooling system 10 is beginning operation, controller 50 may initiate (block 103) a freeze protection mode of freeze protection system 56. To initiate the freeze protection mode, controller 50 may position valve 24 to direct the cooling fluid to bypass thermosyphon cooler 12. Controller 50 also may leave valves 60, 62, and 66 in the open position. Further, controller 50 may close valve 93 to stop the flow of refrigerant within refrigerant loop 80 of thermosyphon cooler 12.

If cooling system 10 is not beginning operation, controller 50 may determine (block 104) whether to initiate a low temperature protection mode of freeze protection system 56. For example, controller 50 may receive the ambient temperature as an input from temperature sensor 68 and may determine whether the ambient temperature is below an ambient temperature set point, which, in certain embodiments, may be 36° F. However, in other embodiments, the ambient temperature set point may vary. If the ambient temperature is below the ambient temperature set point, controller 50 may then determine if there is flow through thermosyphon cooler 12. For example, controller 50 may detect flow through thermosyphon cooler 12 using differential pressure switch 58.

If controller 50 determines that there is no flow through thermosyphon cooler 12, controller 50 may initiate (block 105) the low temperature protection mode of freeze protection system 56. The low temperature protection mode may allow the cooling fluid to be retained within thermosyphon cooler 12 during relatively short periods of low ambient temperatures and/or during relatively short periods of shutdown of cooling system 10. For example, low temperature protection mode may be initiated when cooling system 10 is shutdown overnight when there is no cooling demand from process heat exchanger 18.

To initiate the low temperature protection mode, controller 50 may adjust operation of cooling system 10 to protect the cooling fluid within thermosyphon cooler 12 from freezing. For example, controller 50 may turn off the thermosyphon cooler fans 26. Controller 50 also may ensure that valves 24 and 30 are open to allow the cooling fluid to flow through thermosyphon cooler 12. Further, controller 50 may close valve 93 to stop the flow of refrigerant through refrigerant loop 80. Closing valve 93 may allow the refrigerant to collect within condenser 78, which may inhibit freezing of the cooling fluid within evaporator 76. Controller 50 also may turn on the supplemental heat for evaporator 76, which may provide heat to evaporator 76 to inhibit freezing of the cooling fluid contained within evaporator 76.

If there is flow through thermosyphon cooler 12 and/or if the ambient temperature is above the ambient temperature set point, controller 50 may then determine (block 106) whether the evaporator temperature is below an evaporator temperature set point. For example, controller 50 may receive the evaporator temperature as an input from temperature sensor 57, which may indicate the temperature of the refrigerant within the shell side of evaporator 76. According to certain embodiment, the evaporator temperature set point may be 33° F. However, in other embodiments, the evaporator temperature set point may vary.

If controller 50 determines that the evaporator temperature is below the evaporator temperature set point, controller 50 may initiate (block 108) the freeze protection mode of freeze protection system 56. To initiate the freeze protection mode, controller 50 may adjust operation of cooling system 10 so that the cooling fluid bypasses thermosyphon cooler 12. In particular, controller 50 may turn off the thermosyphon cooler fans 26 and may divert water away from thermosyphon cooler 12 using valve 24. Controller 50 also may position valve 32 to direct the cooling fluid exiting thermosyphon cooler 12 directly to sump 42. After the cooling fluid has drained from thermosyphon cooler 12, controller 50 may position valve 32 to allow the cooling fluid to flow through cooling tower 14, where the cooling fluid may be cooled by evaporative cooling.

In the freeze protection mode, controller 50 also may drain cooling fluid from thermosyphon cooler 12. For example, controller 50 may close valve 30 and open valves 60 and 62 to direct the cooling fluid within thermosyphon cooler 12 to drain line 64. Controller 50 also may open valve 66 to inject air into thermosyphon cooler 12 to further promote drainage of the cooling fluid from thermosyphon cooler 12. According to certain embodiments, draining the cooling fluid from thermosyphon cooler 12 in freeze protection mode may protect tubes 85 from damage due to expansion and/or freezing of the cooling fluid.

If controller 50 determines that the freeze protection mode should not be initiated, controller 50 may then determine (block 110) whether the freeze protection mode should be disabled. First, controller 50 may determine whether freeze protection mode is currently enabled, for example, based on the positions of valves 24, 60, 62, 66, and 30. If freeze protection mode is currently enabled, controller 50 may then determine whether the intermediate temperature (i.e. the temperature of the cooling fluid exiting thermosyphon cooler 12), as measured by temperature sensor 70, is above an intermediate temperature set point, which, in certain embodiments, may be approximately 50° F. However, in other embodiments, the intermediate temperature set point may vary.

If the intermediate temperature is not above the intermediate temperature set point, controller 50 may allow cooling system 10 to continue operating in the freeze protection mode. However, if the intermediate temperature is above the intermediate temperature set point, controller 50 may initiate (block 112) a freeze restart sequence to allow the cooling fluid to flow through thermosyphon cooler 12. In particular, controller 50 may close drain valves 60 and 62 and also may close vent valve 66. Further, controller 50 may adjust the positions of valves 24 and 30 to allow the cooling fluid to flow through thermosyphon cooler 12. Accordingly, cooling system 10 may now be operating in a process cooling mode where the cooling fluid flows through thermosyphon cooler 12 to be cooled by the ambient air.

Figure 7:
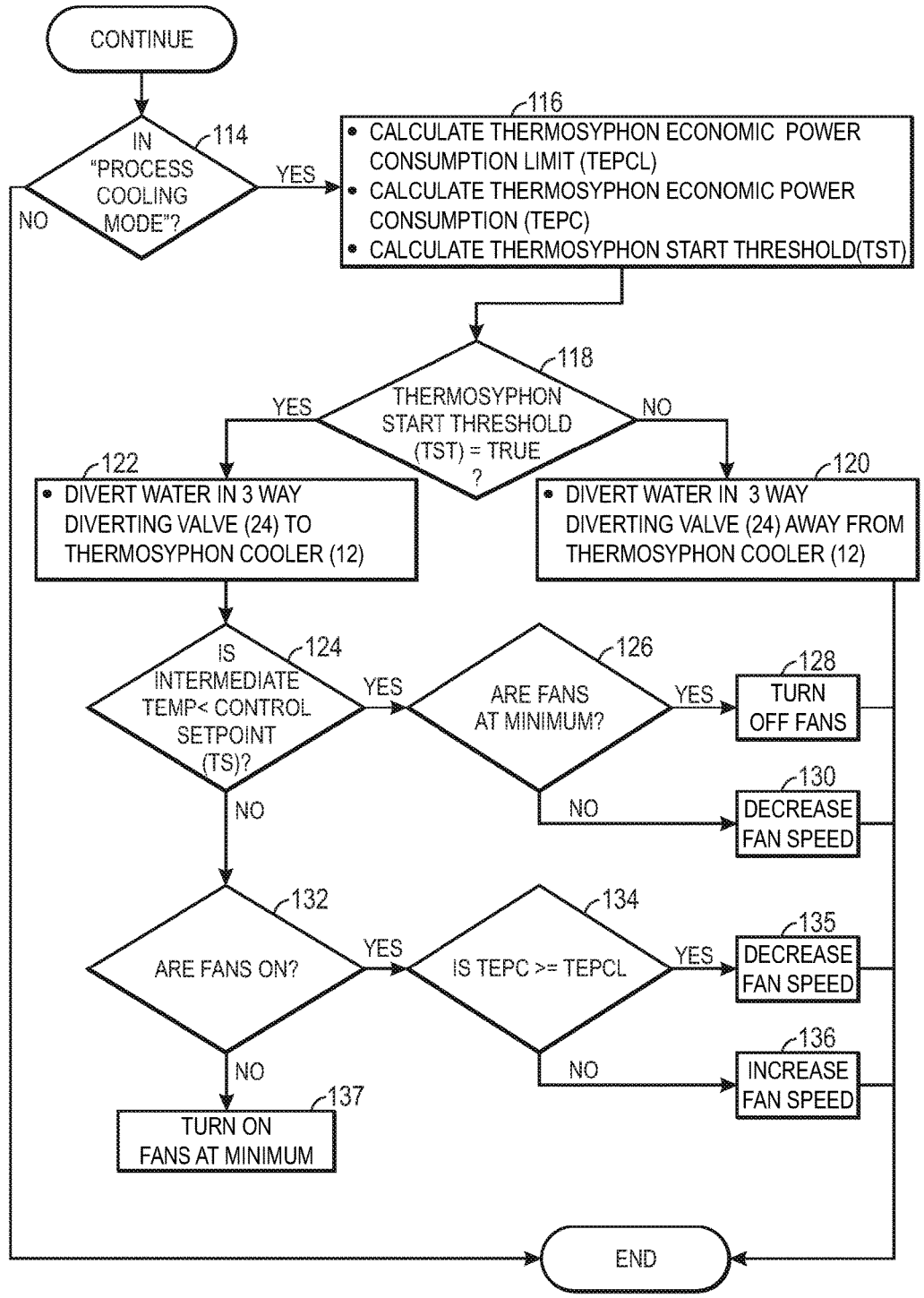
FIG. 7 is a flow chart continuing the method for operating a thermosyphon cooler shown in FIG. 6.

As shown in FIG. 7, method 100 may then continue by determining (block 114) whether cooling system 10 is operating in a process cooling mode. In the process cooling mode, cooling system 10 may be set so that the cooling fluid is directed through both thermosyphon cooler 12 and cooling tower 14. According to certain embodiments, controller 50 may detect operation in the process cooling mode based on inputs from motors 28 and 40 and valves 24 and 32. If controller 50 detects that cooling system 10 is not operating in the process cooling mode, controller 50 may leave cooling system 10 operating in its current mode. For example, if cooling system 10 is not operating in the process cooling mode, cooling system 10 may be operating in the freeze protection mode or in the low temperature mode.

If cooling system 10 is operating in the process cooling mode, controller 50 may then perform (block 116) calculations that may be used to determine (block 118) whether cooling with thermosyphon cooler 12 should be enabled. For example, controller 50 may calculate the thermosyphon economic power consumption limit (TEPCL). As shown in FIG. 8, the TEPCL may be the maximum kilowatts of electricity that should be used by condenser fans 26 per degree of cooling fluid temperature drop achieved by thermosyphon cooler 12 to ensure that the avoided water costs are greater than the incremental electricity costs used to operate thermosyphon cooler 12.

The TEPCL may be calculated using inputs such as the cost of water, the cost of electricity, ambient wet bulb and dry bulb temperatures, cooling tower water usage (e.g., measured by flow meter 47), the cost of waste water, the cost of water treatment, and/or cooling tower fan power consumption, among others. The costs of water and electricity may be input by an operator or may be obtained by controller 50 over a network connection. Using the water and electricity rates, controller 50 may calculate the TEPCL as the maximum kilowatts that should be used by the condenser fan motors 28 per degree of cooling as measured by the temperature difference between the temperature of the cooling fluid exiting process heat exchange 18, as measured by sensor 72, and the temperature of the cooling fluid exiting thermosyphon cooler 12 (i.e. the intermediate temperature), as measured by sensor 70.

The TEPCL may be used to calculate a thermosyphon start threshold (TST). As shown in FIG. 7, the thermosyphon start threshold may be the minimum temperature difference that should exist between the temperature of the cooling fluid exiting process heat exchanger 18, as measured by temperature sensor 72, and the ambient air temperature, as measured by temperature sensor 68, to allow the thermosyphon cooler 12 to be operated at an economic power consumption level below the TEPCL when condenser fans 26 are operated at a low fan speed.

Controller 50 may then use the calculated TST to determine (block 118) whether the actual temperature difference between the cooling fluid exiting process heat exchanger 18 and the ambient air temperature is greater than the TST. For example, controller 50 may calculate the actual temperature difference based on the temperatures received from sensors 72 and 68. If the actual temperature difference is below the TST, controller 50 may disable (block 120) operation of thermosyphon cooler 12. For example, controller 50 may position valve 24 so that the cooling fluid bypasses thermosyphon cooler 12. Further, in certain embodiments, controller 50 may turn off condenser fans 26.

Moreover, in certain embodiments, controller 50 also may determine whether an ambient temperature is above a high temperature set point. For example, controller 50 may receive an input from temperature sensor 68 that indicates the ambient temperature. If the ambient temperature is above the high temperature set point, controller 50 may disable (block 120) operation of thermosyphon cooler 12. According to certain embodiments, the high temperature set point may be the ambient temperature above which heat would be added to the cooling fluid flowing through thermosyphon cooler 12. Accordingly, in certain embodiments, the high temperature set point may depend on the temperature of the cooling fluid exiting process heat exchanger 18, which may be detected by temperature sensor 72. In situations where the ambient temperature is approximately equal to or higher than the temperature of the cooling fluid exiting process heat exchanger 18, it may be desirable to bypass thermosyphon cooler 12 to avoid adding heat from the ambient air to the cooling fluid.

If, on the other hand, controller 50 determines (block 118) that the ambient temperature is below the high temperature set point and/or if the actual temperature difference is greater than the TST, controller 50 may enable (block 122) operation of thermosyphon cooler 12. For example, controller 50 may position valve 24 to allow the cooling fluid to flow through thermosyphon cooler 12. Accordingly, the cooling fluid may flow through thermosyphon 12 where the fluid may be cooled by the ambient air.

After thermosyphon cooler 12 is enabled, controller 50 may then adjust operation of fans 26 to vary the amount of cooling provided by thermosyphon cooler 12. According to certain embodiments, the operation of fans 26 may be adjusted to minimize consumption of electricity while still providing the desired amount of cooling. For example, controller 50 may determine (block 124) whether the intermediate temperature, as measured by temperature sensor 70, is below the cooling system temperature set point. When the intermediate temperature is at or below the cooling system temperature set point, which is the desired temperature of the cooling fluid entering process heat exchanger 18, thermosyphon cooler 12 may be capable of providing enough cooling to achieve the cooling system temperature set point, without additional cooling from cooling tower 14. Further when the intermediate temperature is below the cooling system temperature set point, thermosyphon 12 may be currently overcooling the cooling fluid, and accordingly, the speed of condenser fans 26 may be reduced.

If the intermediate temperature is below the cooling system temperature set point, controller 50 may then determine (block 126) whether the condenser fans are operating at the minimum speed. If the condenser fans are operating at the minimum speed, controller 50 may turn off (block 128) the condenser fans. In these embodiments, the temperature of the ambient air may be low enough to cool the cooling fluid to the cooling system temperature set point without using electricity to operate the fans. In this mode of operation, thermosyphon cooler 12 may be operated without consuming electricity. On the other hand, if controller 50 determines (block 126) that the fans are not operating at the minimum fan speed, controller 50 may decrease (block 130) the fan speed. Reducing the fan speed may reduce the amount of electricity consumed by thermosyphon cooler 12.

If controller 50 determines (block 124) that the intermediate temperature is above the cooling system temperature set point, thermosyphon cooler 12 may not be currently providing enough cooling to achieve the cooling system temperature set point. Accordingly, controller 50 may determine whether it should increase the cooling capacity of thermosyphon cooler 12 by adjusting the speed of the condenser fans. First, controller 50 may determine (block 132) whether the condenser fans are operational. If the fans are operational, controller 50 may then determine (block 134) whether the fans are operating in an economically efficient manner. According to certain embodiments, controller 134 may calculate the current thermosyphon economic power consumption (TEPC) used by thermosyphon cooler 12. For example, controller 50 may calculate the current kilowatts being used by motor 28 and may divide these kilowatts by the temperature difference between the temperature of the cooling fluid exiting process heat exchanger 18, as measured by temperature sensor 72 and temperature of the cooling fluid exiting thermosyphon cooler 12, as measured by temperature sensor 70.

The controller 50 may then compare the actual TEPC to the TEPCL. If the actual TEPC is above the TEPCL, controller 50 may then decrease (block 135) the fan speed. Decreasing the fan speed may reduce the amount of cooling provided by thermosyphon cooler 12 and accordingly, more cooling may be provided by cooling tower 14. In these instances, controller 50 may increase the speed of cooling tower fan 38 to provide additional cooling capacity. On the other hand, if the TEPC is below the TEPCL, controller 50 may increase (block 136) the speed of the condenser fans to increase the amount of cooling provided by thermosyphon cooler 12. Further, if controller 50 determines (block 132) that the fans are not on, controller 50 may turn on (block 137) the fans to the minimum fan speed. Controller 50 may then again determine (block 124) whether the intermediate temperature is below the cooling system temperature set point and may then adjust operation of the condenser fans as described above with respect to blocks 126 to 137.

As may be appreciated, a certain amount of hysteresis may be employed when varying operation of the condenser fans. For example, in certain embodiments, controller 50 may adjust operation of the condenser fans after detecting a threshold amount of change in the intermediate temperature, as measured by temperature sensor 70.

FIG. 8 depicts various input and outputs that may be used by controller 50 to govern operation of cooling system 10. As described above, the input and outputs may be analog and/or digital outputs and may be used by controller 50 to enable the freeze protection system 56 and to govern operation of thermosyphon cooler 12 and cooling tower 14. Further, in certain embodiments, the inputs and outputs shown in FIG. 7 may be employed by controller 50 to determine when to direct the cooling fluid through thermosyphon cooler 12, through cooling tower 14, or through both thermosyphon cooler 12 and cooling tower 14.

Figure 9:
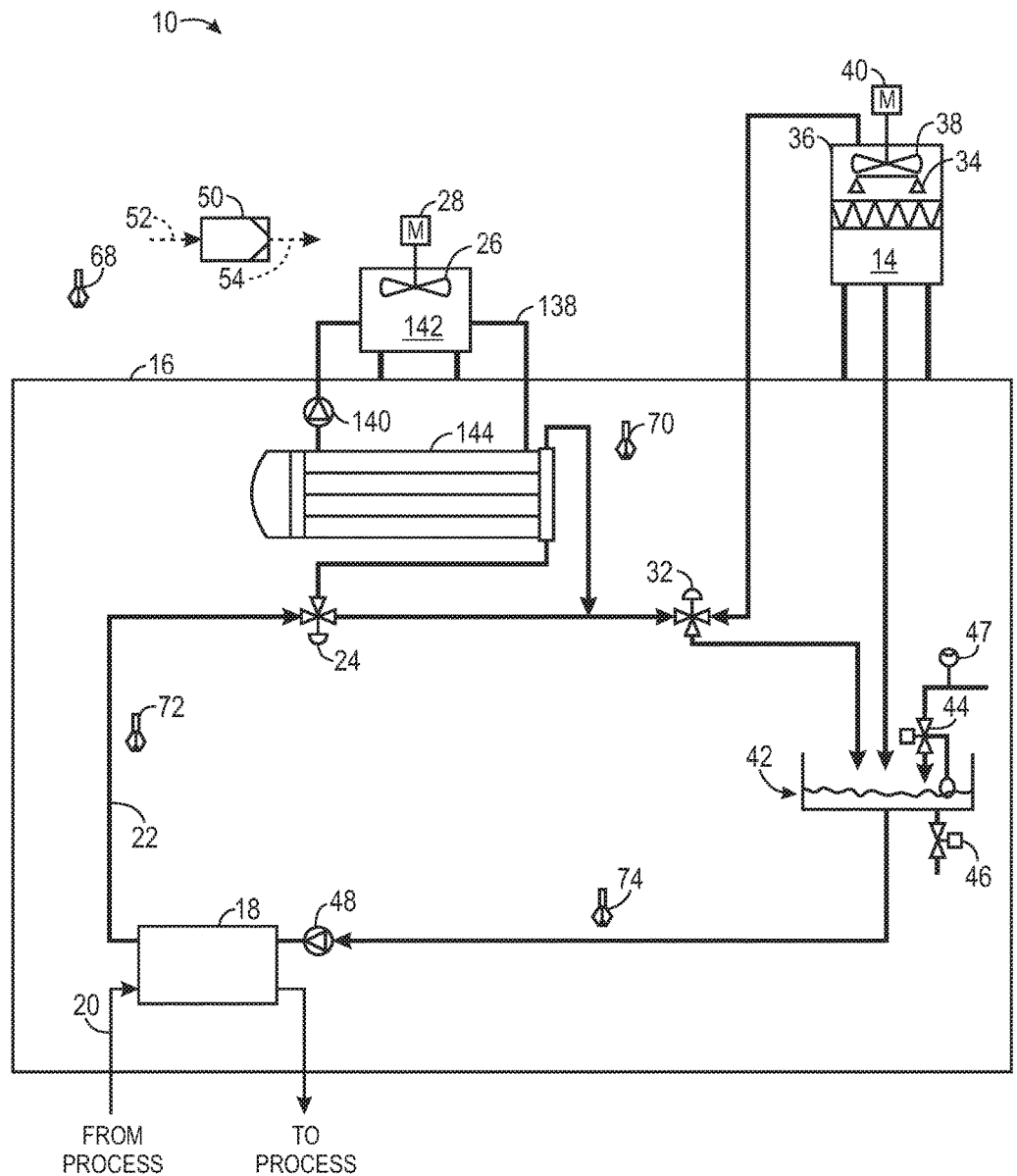
FIG. 9 is a schematic diagram of an embodiment of a cooling system that employs a dry heat rejection system and an open loop cooling tower.

Although FIGS. 6 and 7 describe method 100 in the context of a thermosyphon cooler, in other embodiments, portions of method 100 may be employed to control cooling systems with other types of dry heat rejection systems, such as dry coolers used in conjunction with a freeze protectant coolant. FIG. 9 depicts another embodiment of cooling system 10, which includes a dry cooler 142 and a heat exchanger 144. According to certain embodiments, dry cooler 142 may be similar to the air cooled condenser 78 employed within thermosyphon cooler 12. However, in other embodiments, any suitable air cooled condenser or other type of dry heat rejection device may be used. As used herein, the term "dry heat rejection device" may refer to a heat transfer device that does not employ wet or evaporative cooling. According to certain embodiments, heat exchanger 144 may be similar to the evaporator 76 employed in the thermosyphon cooler 12. However, in other embodiments, any suitable type of heat exchanger, such as a plate heat exchanger, may be employed.

As shown in FIG. 9, cooling system 10 includes a dry heat rejection system that includes heat exchanger 144, dry cooler 142, a freeze protectant coolant loop 138, such as a glycol or brine loop, and a pump 140. The cooling fluid from process heat exchanger 18 may flow through heat exchanger 144, where the cooling fluid may transfer heat to the freeze protectant coolant, such as glycol or brine, flowing through heat exchanger 144. The cooling fluid may then exit heat exchanger 144 and flow to cooling tower 14 where the cooling fluid may be further cooled as described above with respect to FIG. 1. In certain embodiments where heat exchanger 144 is a shell and tube heat exchanger, the cooling fluid may flow through the tubes of heat exchanger 144 while freeze protectant coolant, such as a glycol or brine, flows through the shell side of heat exchanger 144.

Within the dry heat rejection system, the heated freeze protectant coolant from heat exchanger 144 may flow through coolant loop 138 to dry cooler 142 via pump 140. Although not shown, pump 140 may be driven by one or more motors. Within dry cooler 142, the freeze protectant coolant may be cooled by air that is directed through dry cooler 142 by fans 26. The cooled coolant may then exit dry cooler 142 and return to heat exchanger 144 where the coolant may again absorb heat from the cooling fluid flowing through heat exchanger 144.

Because of the additional freeze protectant coolant loop 138, the cooling fluid may be contained within building 16 and may not be exposed to the ambient air. Accordingly, a freeze protection system may not be employed because the cooling system may be protected from low ambient temperatures by building 16. Accordingly, blocks 102 to 112 of method 100 (FIG. 6) may be omitted when operating the embodiment of the cooling system shown in FIG. 9. However, as shown in FIG. 10, a method 146 that is similar to blocks 114 to 137 of FIG. 7 may be employed to operate the dry heat rejection system shown in FIG. 9.

Figure 10:
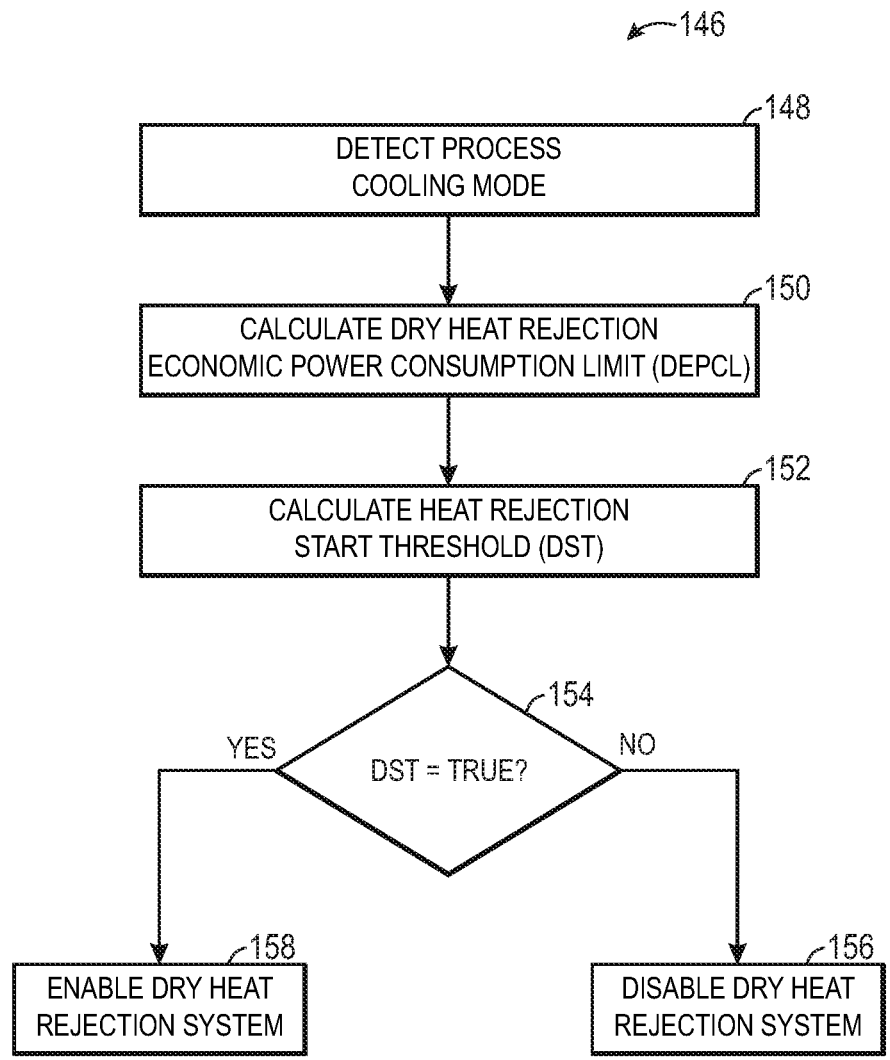
FIG. 10 is a flow chart depicting a method for operating a dry heat rejection system.

As shown in FIG. 10, method 146 may begin by detecting (block 148) that cooling system 10 is operating in a process cooling mode. For example, controller 50 may detect operation in the process cooling mode based on the positions of valves 24 and 32. If controller 50 detects that the system is operating in a process cooling mode, controller 50 may then calculate (block 150) the dry heat rejection economic power consumption limit (DEPCL).

The DEPCL may be similar to the TEPCL described above with respect to FIGS. 5 to 7. For example, the DEPCL may be the maximum kilowatts of electricity used by the dry heat rejection system per degree of cooling fluid temperature drop achieved by the dry heat rejection system to ensure that the avoided water costs are greater than the incremental electricity costs used to operate the dry heat rejection system. For example, as shown in FIG. 8, the electricity costs may be based on the electrical consumption of motor 28 used to drive fans 26, as well as the electricity used by the motor that drives pump 140. Controller 50 may then calculate (block 152) the dry heat rejection system start threshold (DST). The DST may be similar to the TST described above with respect to FIGS. 5 to 7. For example, the DST may be the minimum temperature difference that should exist between the temperature of the cooling fluid exiting the process heat exchanger, as measured by sensor 72, and the ambient temperature, as measured by temperature sensor 68, that is known to enable an actual power consumption of the dry heat rejection system, which is below the DEPCL.

Controller 50 may then use the calculated DST to determine (block 154) whether the actual temperature difference between the cooling fluid exiting process heat exchanger 18 and the ambient air is greater than the DST. If the actual temperature difference is below the DST, controller 50 may disable (block 156) operation of the dry heat rejection system. For example, controller 50 may position valve 24 to direct the cooling fluid to bypass heat exchanger 144 and flow directly through valve 32 to cooling tower 14. Further, in certain embodiments, controller 50 may turn off fans 26 and pump 140.

On the other hand, if controller 50 determines (block 154) that the actual temperature difference is greater than the DST, controller 50 may enable (block 158) the dry heat rejection system. For example, controller 50 may adjust valve 24 to direct the cooling fluid through heat exchanger 144 to transfer heat from the cooling fluid to the freeze protectant coolant that flows through dry cooler 142. Further, controller 50 may turn on fans 26 and pump 140. Moreover, while the dry heat rejection system is operating, controller 50 may govern operation of fans 26 as described above in FIG. 6 with respect to blocks 124 to 137.

Figure 11:
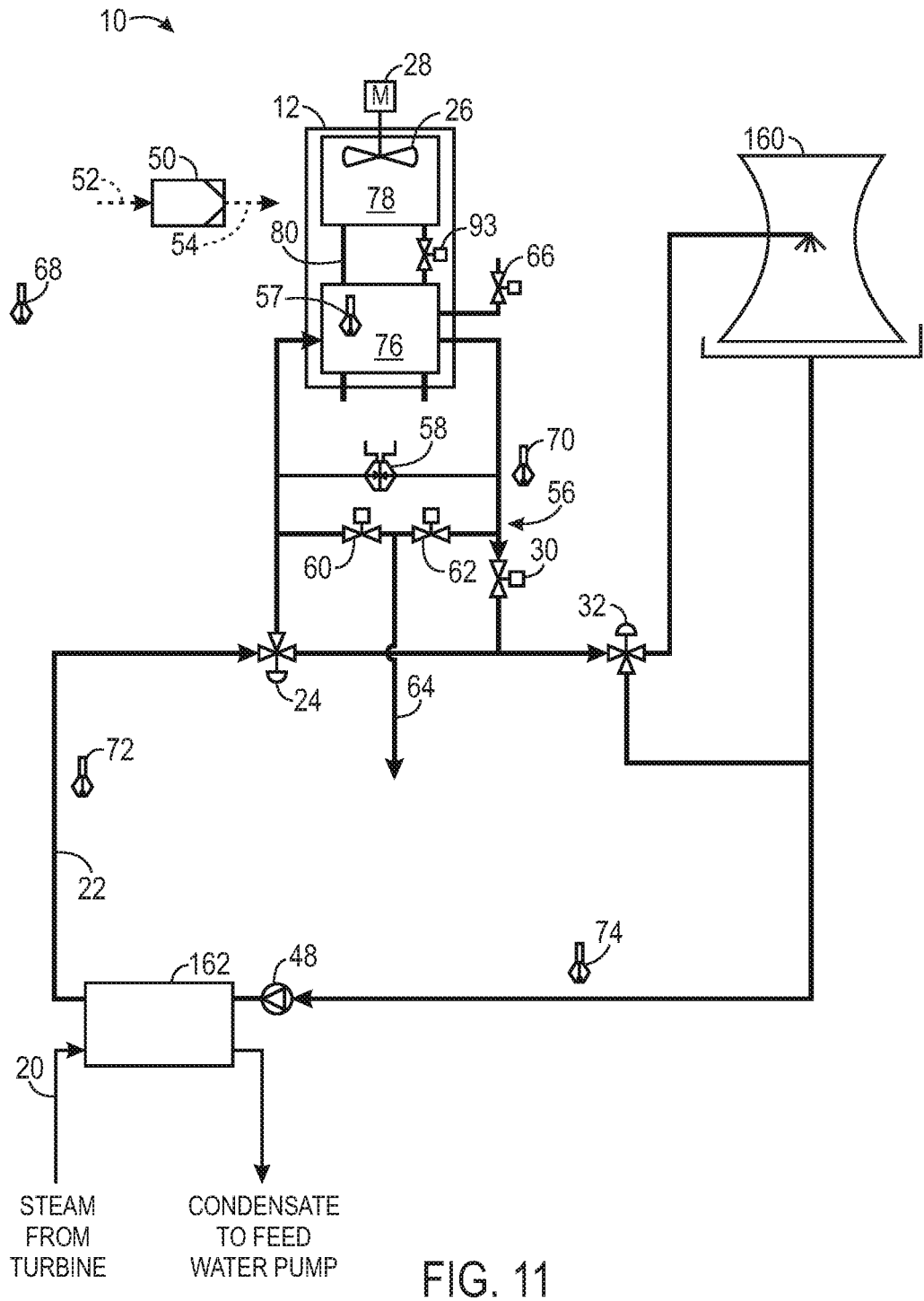
FIG. 11 is a schematic diagram of another embodiment of a cooling system that employs a thermosyphon cooler and an open loop cooling tower.

FIG. 11 depicts another embodiment of cooling system 10 that includes thermosyphon cooler 12 and an open loop cooling tower 160, which is a natural draft hyperbolic cooling tower. A steam condenser 162 may be used to transfer heat from steam from a turbine to cooling system loop 22. According to certain embodiments, the cooling system 10 may be used to provide cooling for a power plant. The cooling system shown in FIG. 11 may operate generally similar to the cooling system described above with respect to FIG. 1, and method 100 may be employed to operate the cooling system, as described above with respect to FIGS. 6 and 7.

Figure 12:
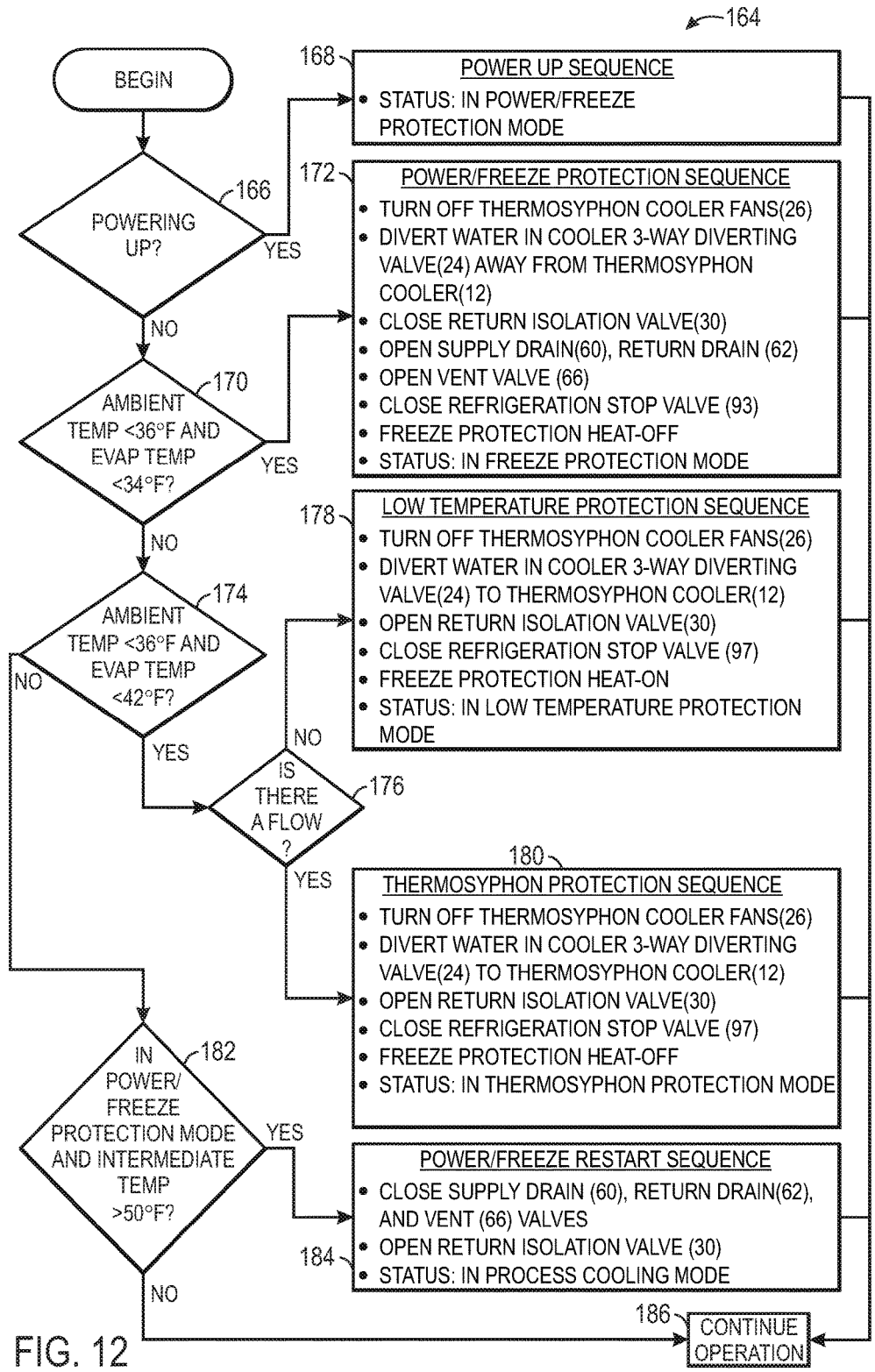
FIG. 12 is a flow chart depicting another embodiment of a method for operating a thermosyphon cooler.

FIG. 12 depicts another embodiment of a method 164 that may be employed to govern operation of a cooling system 10 that includes an open loop cooling tower, as shown in FIGS. 1, 4, and 11 or a closed loop cooling tower, as shown in FIG. 5. Method 164 may be generally similar to the freeze protection portion of method 100 that is shown in FIG. 6. However, rather than employing a single evaporator temperature set point to determine when to initiate a freeze protection sequence, method 164 employs a high evaporator temperature set point and a low evaporator temperature set point.

Method 164 may begin by determining (block 166) whether cooling system 10 is beginning operation. For example, cooling system 10 may begin operation upon startup of process heat exchanger 18. If cooling system 10 is beginning operation, controller 50 may initiate (block 168) the freeze protection mode of freeze protection system 56. The freeze protection mode may be initiated in a manner similar to that described above with respect to block 103 of FIG. 6. For example, to initiate the freeze protection mode, controller 50 may position valve 24 to direct the cooling fluid to bypass thermosyphon cooler 12. Controller 50 also may leave valves 60, 62, and 66 in the open position. Further, controller 50 may close valve 93 to stop the flow of refrigerant within refrigerant loop 80 of thermosyphon cooler 12.

If cooling system 10 is not beginning operation, controller 50 may determine (block 170) whether to initiate the freeze protection mode. For example, controller 50 may receive the ambient temperature as an input from temperature sensor 68 and may determine whether the ambient temperature is below an ambient temperature set point, which, in certain embodiments, may be 36° F. However, in other embodiments, the ambient temperature set point may vary. If the ambient temperature is below the ambient temperature set point, controller 50 may then determine (block 170) whether the evaporator temperature is below an evaporator low temperature set point. For example, controller 50 may receive the evaporator temperature as an input from temperature sensor 57, which may indicate the temperature of the refrigerant within the shell side of evaporator 76. According to certain embodiments, the evaporator low temperature set point may be 34° F. However, in other embodiments, the evaporator low temperature set point may vary.

If controller 50 determines that the evaporator temperature is below the evaporator low temperature set point, controller 50 may initiate (block 172) the freeze protection mode. The freeze protection mode may be initiated in a manner similar to that described above with respect to block 108 of FIG. 6. To initiate the freeze protection mode, controller 50 may adjust operation of cooling system 10 so that the cooling fluid bypasses thermosyphon cooler 12. In particular, controller 50 may turn off the thermosyphon cooler fans 26 and may divert water away from thermosyphon cooler 12 using valve 24. Controller 50 also may position valve 32 to direct the cooling fluid exiting thermosyphon cooler 12 directly to sump 42. After the cooling fluid has drained from thermosyphon cooler 12, controller 50 may position valve 32 to allow the cooling fluid to flow through cooling tower 14, where the cooling fluid may be cooled by evaporative cooling.

In the freeze protection mode, controller 50 also may drain cooling fluid from thermosyphon cooler 12. For example, controller 50 may close valve 30 and open valves 60 and 62 to direct the cooling fluid within thermosyphon cooler 12 to drain line 64. Controller 50 also may open valve 66 to inject air into thermosyphon cooler 12 to further promote drainage of the cooling fluid from thermosyphon cooler 12. According to certain embodiments, draining the cooling fluid from thermosyphon cooler 12 in freeze protection mode may protect tubes 85 from damage due to expansion and/or freezing of the cooling fluid. Further, controller 50 may turn off supplemental heat to evaporator 76.

If the evaporator temperature is not below the evaporator low temperature set point, controller 50 may then determine whether the evaporator temperature is below an evaporator high temperature set point. For example, controller 50 may determine whether the evaporator temperature received as an input from temperature sensor 57 is less than the evaporator high temperature set point. According to certain embodiments, the evaporator high temperature set point may be 42° F. However, in other embodiments, the evaporator high temperature set point may vary.

If controller 50 determines that the evaporator temperature is below the evaporator high temperature set point and that the ambient temperature is below the ambient temperature set point, controller 50 may then determine (block 176) if there is flow through thermosyphon cooler 12. For example, controller 50 may detect flow through thermosyphon cooler 12 using differential pressure switch 58.

If controller 50 determines that there is no flow through thermosyphon cooler 12, controller 50 may initiate (block 178) the low temperature protection mode of freeze protection system 56. The low temperature protection mode may be similar to that described above with respect to block 105 of FIG. 6. For example, the low temperature protection mode may allow the cooling fluid to be retained within thermosyphon cooler 12 during relatively short periods of low ambient temperatures and/or during relatively short periods of shutdown of cooling system 10.

To initiate the low temperature protection mode, controller 50 may adjust operation of cooling system 10 to protect the cooling fluid within thermosyphon cooler 12 from freezing. For example, controller 50 may turn off the thermosyphon cooler fans 26. Controller 50 also may ensure that valves 24 and 30 are open to allow the cooling fluid to flow through thermosyphon cooler 12. Further, controller 50 may close valve 93 to stop the flow of refrigerant through refrigerant loop 80. Closing valve 93 may allow the refrigerant to collect within condenser 78, which may inhibit freezing of the cooling fluid within evaporator 76. Controller 50 also may turn on the supplemental heat for evaporator 76, which may provide heat to evaporator 76 to inhibit freezing of the cooling fluid contained within evaporator 76.

If, on the other hand, controller 50 determines that there is flow through thermosyphon cooler 12, controller 50 may initiate (block 180) the thermosyphon protection mode of freeze protection system 56. The thermosyphon protection mode may be initiated in a manner similar to the low temperature protection mode described above with respect to block 178. However, rather than turning on the supplemental heat for evaporator 76, the supplemental heat may be turned off (or may remain off) since there is flow through evaporator 76. According to certain embodiments, the flow of the cooling fluid through evaporator may inhibit freezing of the cooling fluid in the evaporator, and accordingly, the supplemental heat may not be desired. In addition to turning off the supplemental heat, controller 50 may turn off the thermosyphon cooler fans 26. Controller 50 also may ensure that valves 24 and 30 are open to allow the cooling fluid to flow through thermosyphon cooler 12. Further, controller 50 may close valve 93 to stop the flow of refrigerant through refrigerant loop 80 and allow the refrigerant to collect within condenser 78.

If controller 50 determines that none of the protection modes should be initiated, controller 50 may then determine (block 182) whether the freeze protection mode should be disabled. First, controller 50 may determine whether freeze protection mode is currently enabled, for example, based on the positions of valves 24, 60, 62, 66, and 30. If the freeze protection mode is currently enabled, controller 50 may then determine whether the intermediate temperature (i.e. the temperature of the cooling fluid exiting thermosyphon cooler 12), as measured by temperature sensor 70, is above an intermediate temperature set point, which, in certain embodiments, may be approximately 50° F. However, in other embodiments, the intermediate temperature set point may vary.

If the intermediate temperature is not above the intermediate temperature set point and/or the freeze protection mode is not currently enabled, controller 50 may allow cooling system 10 to continue operating (block 186) in its current mode. However, if the intermediate temperature is above the intermediate temperature set point, controller 50 may initiate (block 184) a freeze restart sequence to allow the cooling fluid to flow through thermosyphon cooler 12. The freeze restart sequence may be initiated in a manner similar to that described above with respect to block 112 of FIG. 6. For example, controller 50 may close drain valves 60 and 62 and also may close vent valve 66. Further, controller 50 may adjust the positions of valves 24 and 30 to allow the cooling fluid to flow through thermosyphon cooler 12. Accordingly, cooling system 10 may now be operating in a process cooling mode where the cooling fluid flows through thermosyphon cooler 12 to be cooled by the ambient air. Controller 50 may then continue to operate (block 186) cooling system 10 in its current mode. For example, in certain embodiments, the controller 50 may then govern operation of cooling system 10 as described above with respect to blocks 114 to 137 of FIG. 7.

Figure 13:
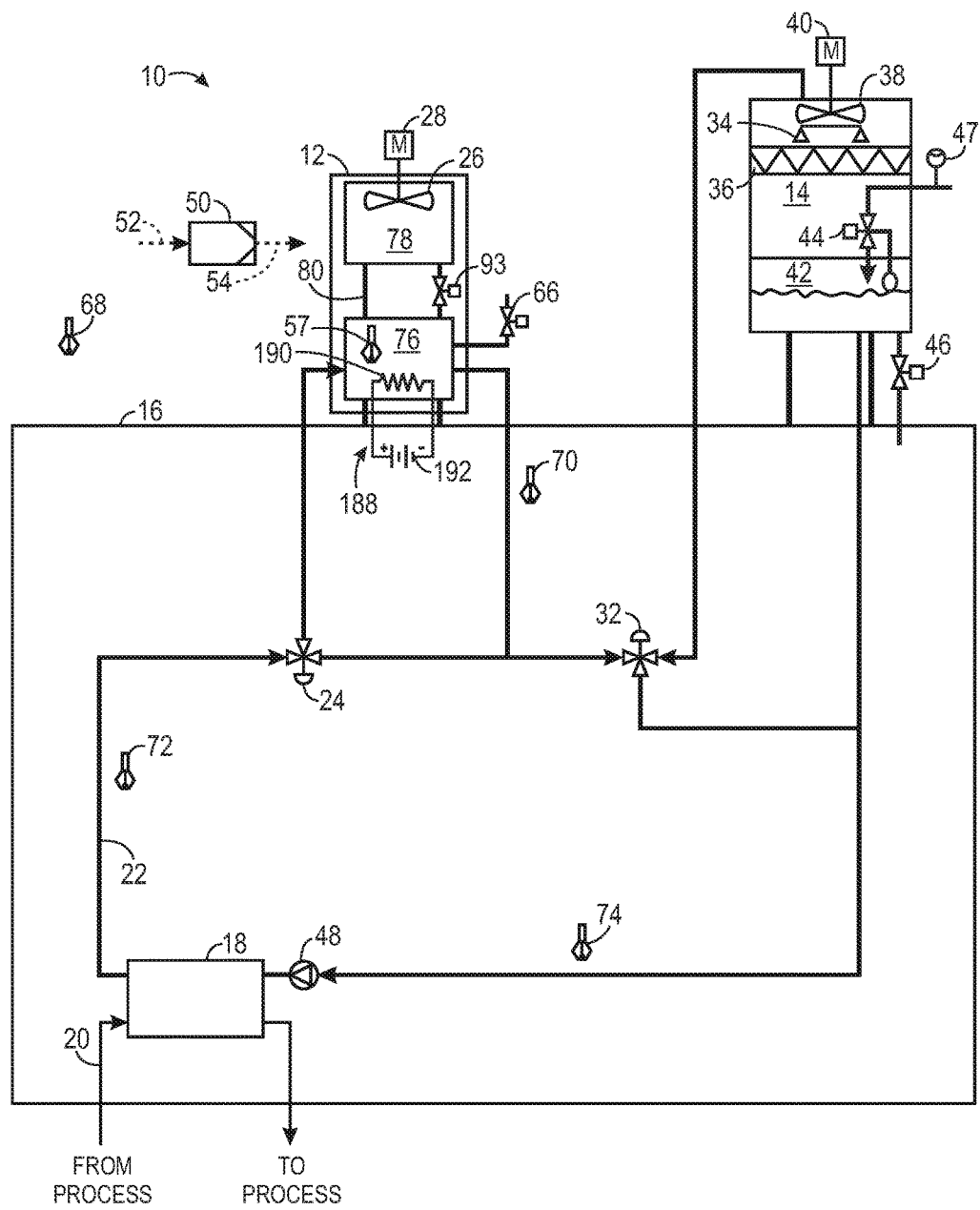
FIG. 13 is a schematic diagram of another embodiment of a cooling system that employs a thermosyphon cooler and a cooling tower.

FIG. 13 depicts another embodiment of cooling system 10 that includes open loop cooling tower 14 and thermosyphon cooler 12. The embodiment of cooling system 10 shown in FIG. 13 is generally similar to the embodiment of cooling system 10 described above with respect to FIG. 4. However, rather than including a freeze protection system 56 that enables draining of the cooling fluid from evaporator 76, the cooling system 10 shown in FIG. 13 includes a freeze protection system 188 that provides supplemental heating when freeze protection is desired.

The freeze protection system 188 includes one or more heaters 190 that are powered by a power supply 192. Heaters 190 may include heat tracing, cartridge heaters, or a combination thereof, as well as other types of electric heaters. According to certain embodiments, heaters 190 may include cartridge heaters that extend into shell 84 (FIG. 3) of evaporator 76 to heat the refrigerant circulating within the shell. Further, in certain embodiments, the exterior of evaporator shell 84 may be insulated to enhance heat retention within evaporator 76. Power supply 192 may include one or more batteries or other type of power supply, such as a generator or system standby power system, among others. In certain embodiments, power supply 192 may be an independent power source, such as one or more batteries, that solely powers heaters 190. However, in other embodiments, power supply 192 may be a backup or standby power system designed to provide power for other equipment and/or processes in a facility employing cooling system 10. Further, although freeze protection system 188 is shown in FIG. 13 as part of a cooling system 10 that includes an open loop cooling tower with an integrated sump, in other embodiments, freeze protection system 188 may be employed in other types of cooling systems 10, such as those shown in FIGS. 1, 5, and 11.

Controller 50 may govern operation of freeze protection system 188. According to certain embodiments, controller 50 may be communicatively coupled to power supply 192 to turn on heaters 190 when freeze protection is desired. For example, controller 50 may send a control signal to power supply 192 to enable heaters 190 when the ambient temperature, as detected by sensor 68, is below an ambient temperature set point. In another example, controller 50 may enable heaters 190 when the evaporator temperature, as detected by sensor 57 is below an evaporator temperature set point. In a further example, controller 50 may disable heaters 190 when the temperature of the cooling fluid exiting thermosyphon cooler 12, as detected by sensor 70, is above an intermediate temperature set point.

According to certain embodiments, the cooling systems 10 described herein may be designed and installed as new cooling systems. However, as described below with respect to FIGS. 14 to 16, in other embodiments, existing cooling systems may be retrofit to produce the cooling systems described herein.

Figure 14:
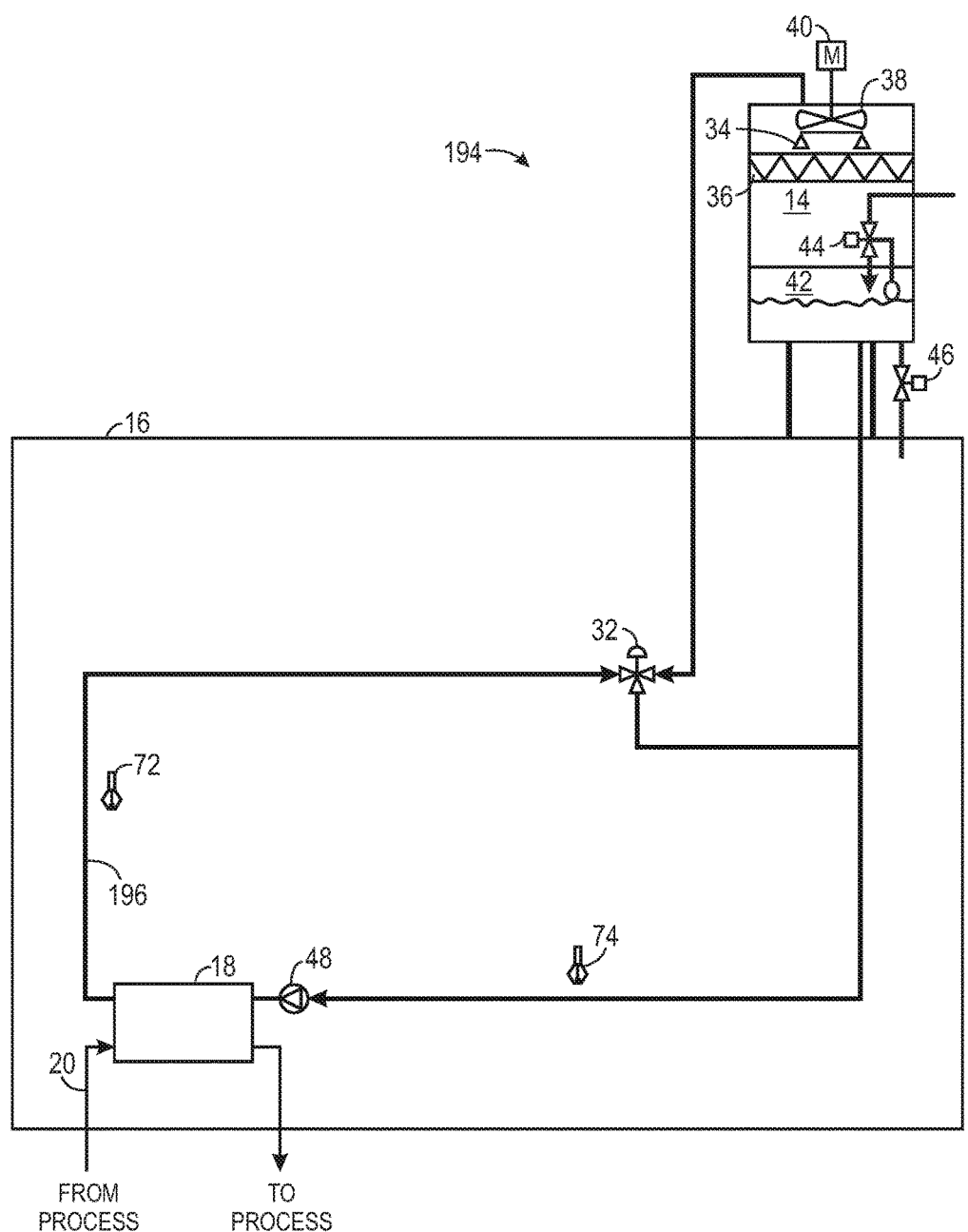
FIG. 14 is a schematic diagram of a prior art cooling system that includes a cooling tower.

FIG. 14 depicts a prior art cooling system 194 that may be retrofit to include the cooling systems described herein. Cooling system 194 includes a cooling system loop 196 that circulates a cooling fluid between process heat exchanger 18 and cooling tower 14. As the cooling fluid flows through process heat exchanger 18, the cooling fluid absorbs heat from the process fluid flowing through process loop 20. The cooling fluid then flows through valve 32 to cooling tower 14 where the cooling fluid may be cooled via evaporative cooling with ambient air. Within cooling tower 14, nozzles 34 direct the cooling fluid over fill material 36, and a fan 38 directs air up through the cooling tower. The cooled cooling fluid may then exit cooling tower 14 and may be collected within sump 42. Valve 44 may be opened to direct makeup cooling fluid into sump 42, and valve 46 may be opened to remove a portion of the cooling fluid, which may contain minerals, salts, and other contaminants, as blowdown. As shown, sump 42 is an integral part of cooling tower 14; however, in other embodiments, sump 42 may be located within building 16, as shown in FIG. 1. Further, although the cooling tower is shown as an open loop cooling tower 14, in other embodiments, cooling tower 14 may be a closed loop cooling tower 94, as shown in FIG. 5, or a hyperbolic cooling tower 160, as shown in FIG. 11.

The cooling system 14 also includes temperature sensor 72, which detects the temperature of the cooling fluid exiting process heat exchanger 18, and temperature sensor 74, which detects the temperature of the cooling fluid entering process heat exchanger 18. In certain embodiments, temperature sensors 72 and 74 may provide the temperatures to a controller (not shown) in the form of input signals, which may be used to control operation of cooling system 194.

Figure 15:
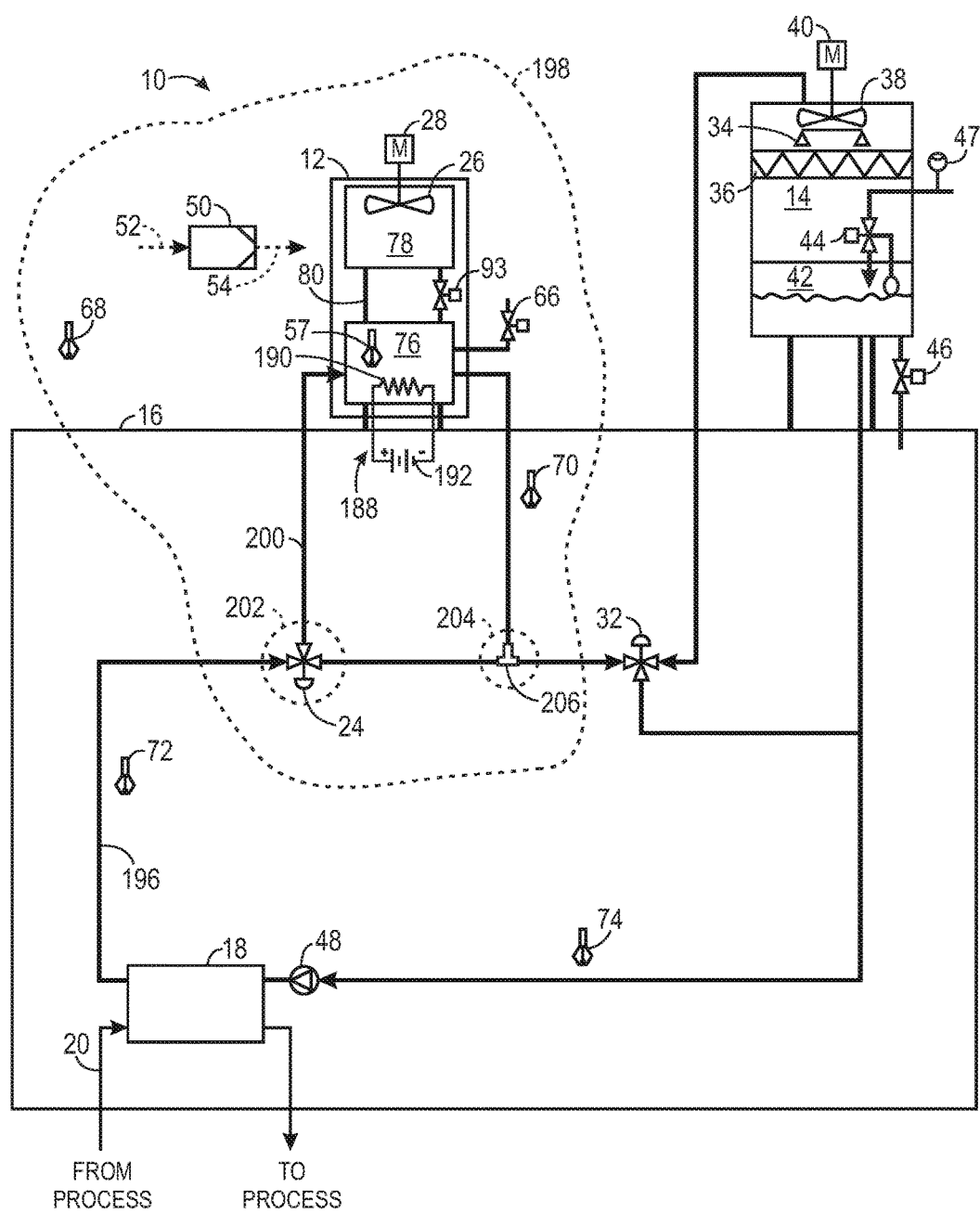
FIG. 15 is a schematic diagram depicting retrofitting of the prior art cooling system of FIG. 14 to include an embodiment of a thermosyphon cooler system.

As shown in FIG. 15, cooling system 194 may be retrofit with a thermosyphon cooling system 198 to form an embodiment of cooling system 10 that includes thermosyphon cooler 12. For example, piping 200 may be coupled to cooling system loop 196 at connection points 202 and 204 to fluidly couple cooling system loop 196 to thermosyphon cooler 12. Valve 24 may be inserted at connection point 202, and a piping connection 204, such as a T-connection, may be inserted at connection 206 point 204 to couple cooling system loop 196 to piping 200. Piping 200 may form a thermosyphon cooling system loop that circulates the cooling fluid from existing cooling system loop 196 to thermosyphon cooler 12.

Thermosyphon cooler 12 and its associated equipment may be coupled to piping 200 to circulate the cooling fluid through thermosyphon cooler 12. Further, controller 50 may be installed to govern operation of cooling system 10. In certain embodiments, controller 50 may be integrated with, or may replace, an existing controller for cooling system 194. Existing sensors 72 and 74 may be communicatively coupled to controller 50. Further, in certain embodiments, flow meter 47 may be installed to measure the flow rate of the make up water entering sump 42 through valve 44.

Figure 16:
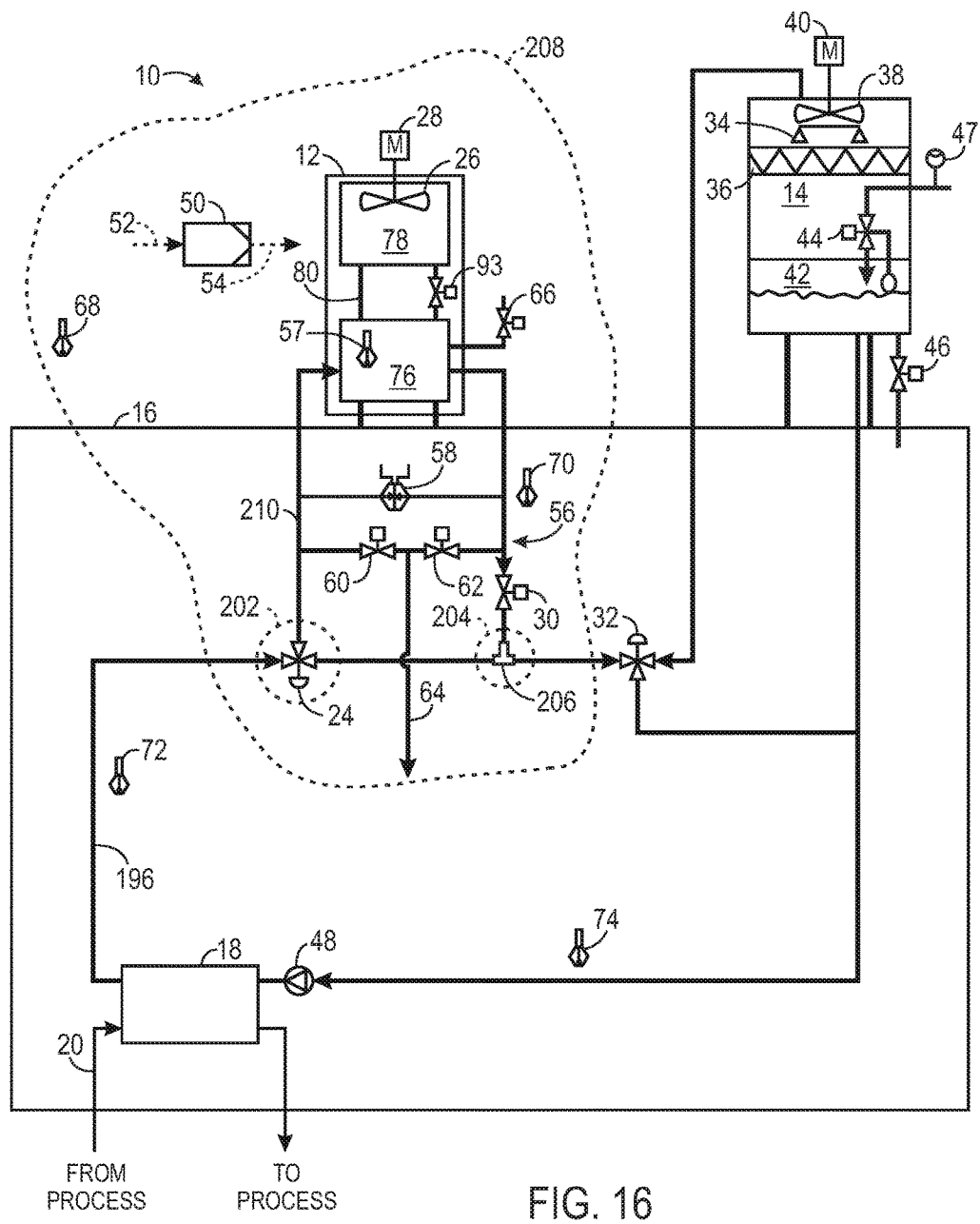
FIG. 16 is a schematic diagram depicting retrofitting of the prior art cooling system of FIG. 14 to include another embodiment of a thermosyphon cooler system.

FIG. 16 depicts another embodiment of a thermosyphon cooling system 208 that may be added to existing cooling system 194 to form an embodiment of cooling system 10. In this embodiment, piping 210 may be coupled to cooling system loop 196 at connection points 202 and 204 to fluidly couple cooling system loop 196 to thermosyphon cooler 12. Valve 24 may be inserted at connection point 202, and piping connection 206 may be inserted at connection point 204 to couple cooling system loop 196 to piping 210. Further, valves 60, 62, and 30, and differential pressure switches 58 may be installed in piping 210 to form freeze protection system 56. Drain line 64 also may be connected to piping 210 to provide for drainage of cooling fluid from piping 210 and evaporator 76.

Thermosyphon cooler 12 and its associated equipment may be coupled to piping 210 to circulate the cooling fluid through thermosyphon cooler 12, and controller 50 may be installed to govern operation of cooling system 10. Further, valve 66 and its corresponding vent line may be installed to inject air into thermosyphon cooler 12 to facilitate drainage of the cooling fluid from thermosyphon cooler 12. Existing sensors 72 and 74 may be communicatively coupled to controller 50. Further, in certain embodiments, flow meter 47 may be installed to measure the flow rate of the make up water entering sump 42 through valve 44.

While only certain features and embodiments of the invention have been illustrated and described, many modifications and changes may occur to those skilled in the art (e.g., variations in sizes, dimensions, structures, shapes, and proportions of the various elements, values of parameters (e.g., temperatures, pressures, etc.), mounting arrangements, use of materials, orientations, etc.) without materially departing from the novel teachings and advantages of the subject matter recited in the claims. For example, the order or sequence of any process or method steps may be varied or re-sequenced according to alternative embodiments. Further, although individual embodiments are discussed herein, the disclosure is intended to cover all combinations of these embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A cooling system, comprising:
    a cooling fluid loop configured to circulate a cooling fluid therethrough;
    a thermosyphon cooler disposed along the cooling fluid loop and configured to transfer heat from the cooling fluid to ambient atmosphere through dry cooling, wherein the thermosyphon cooler comprises a refrigerant, wherein the refrigerant is configured to absorb heat from the cooling fluid and to transfer heat to the ambient atmosphere, and wherein the cooling fluid and the refrigerant are not in fluid communication with one another;
    a cooling tower disposed downstream of the thermosyphon cooler along the cooling fluid loop and configured to transfer heat from the cooling fluid to the ambient atmosphere through evaporative cooling; and
    a controller configured to:
        receive feedback indicative of a temperature of the cooling fluid exiting the thermosyphon cooler from a temperature sensor;
        compare the temperature of the cooling fluid exiting the thermosyphon cooler to a cooling temperature set point;
        reduce a fan speed of one or more fans of the thermosyphon cooler when the temperature of the cooling fluid exiting the thermosyphon cooler is less than the cooling temperature set point;
        determine an economic efficiency of operation of the one or more fans of the thermosyphon cooler based on a water cost, or an electricity cost, or both when the temperature of the cooling fluid exiting the thermosyphon cooler equals or exceeds the cooling temperature set point;
        increase the fan speed of the one or more fans of the thermosyphon cooler when the economic efficiency of operation of the one or more fans of the thermosyphon cooler exceeds a threshold and when the temperature of the cooling fluid exiting the thermosyphon cooler equals or exceeds the cooling temperature set point; and
        reduce the fan speed of the one or more fans of the thermosyphon cooler and initiate operation of the cooling tower when the economic efficiency of operation of the one or more fans of the thermosyphon cooler is less than the threshold and when the temperature of the cooling fluid exiting the thermosyphon cooler equals or exceeds the cooling temperature set point.

2. The system of claim 1, wherein the controller is configured to maintain the fan speed of the one or more fans of the thermosyphon cooler when the temperature of the cooling fluid exiting the thermosyphon cooler is generally equal to the cooling temperature set point and when the economic efficiency of operation of the one or more fans of the thermosyphon cooler equals or exceeds the threshold.

3. The system of claim 1, wherein the controller is configured to turn off the one or more fans of the thermosyphon cooler when the fan speed of the one or more fans of the thermosyphon cooler is at a base speed, and when the temperature of the cooling fluid exiting the thermosyphon cooler is less than the cooling temperature set point.

4. The system of claim 1, wherein the controller is configured to turn off the one or more fans of the thermosyphon cooler when the economic efficiency of operation of the one or more fans of the thermosyphon cooler is less than the threshold.

5. The system of claim 1, wherein the controller is configured to receive inputs indicative of the water cost, or the electricity cost, or both from an operator.

6. The system of claim 1, wherein the controller is configured to receive inputs indicative of the water cost, or the electricity cost, or both from a computer network.

* * * * *